(12) United States Patent
Sugiura

(10) Patent No.: US 8,503,115 B2
(45) Date of Patent: Aug. 6, 2013

(54) LENS DRIVE CONTROL DEVICE AND IMAGE PICKUP DEVICE

(75) Inventor: Koichi Sugiura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 114 days.

(21) Appl. No.: 12/995,239

(22) PCT Filed: Jun. 15, 2009

(86) PCT No.: PCT/JP2009/061257
§ 371 (c)(1),
(2), (4) Date: Nov. 30, 2010

(87) PCT Pub. No.: WO2009/154287
PCT Pub. Date: Dec. 23, 2009

(65) Prior Publication Data
US 2011/0075275 A1   Mar. 31, 2011

(30) Foreign Application Priority Data

Jun. 16, 2008 (JP) ................................. 2008-157271
Mar. 3, 2009 (JP) ................................. 2009-049990

(51) Int. Cl.
*G02B 7/02* (2006.01)

(52) U.S. Cl.
USPC .......................................... 359/817; 359/823

(58) Field of Classification Search
USPC ........................... 359/694–698, 817, 822–824
See application file for complete search history.

(56) References Cited

U.S. PATENT DOCUMENTS

| | | | |
|---|---|---|---|
| 5,523,814 | A | 6/1996 | Sato et al. |
| 5,721,986 | A | 2/1998 | Nomura et al. |
| 7,526,189 | B2 | 4/2009 | Nomura et al. |
| 2006/0034001 | A1 | 2/2006 | Nagai et al. |
| 2007/0019084 | A1 | 1/2007 | Nomura et al. |
| 2007/0279765 | A1* | 12/2007 | Takahashi ................. 359/697 |
| 2009/0284845 | A1 | 11/2009 | Sugiura |

FOREIGN PATENT DOCUMENTS

| | | |
|---|---|---|
| CN | 1893788 A | 1/2007 |
| DE | 10 2006 030 316 A1 | 1/2007 |
| JP | 3-183399 A | 8/1991 |
| JP | 2000-35529 A | 2/2000 |
| JP | 2004-205695 A | 7/2004 |
| JP | 2005-79916 A | 3/2005 |
| JP | 2006-53445 A | 2/2006 |
| JP | 2006-235090 A | 9/2006 |
| JP | 2006-251162 A | 9/2006 |
| JP | 2006-330657 A | 12/2006 |
| JP | 2007-333922 A | 12/2007 |

* cited by examiner

*Primary Examiner* — Mahidere Sahle
(74) *Attorney, Agent, or Firm* — Dickstein Shapiro LLP

(57) ABSTRACT

A lens drive control device for a lens barrel, which controls at least a part of a plurality of lens groups respectively including at least one lens, wherein a state of the lens barrel transits from a retracted state to a photographing extended state, the lens drive control device comprising: a detection device which detects that the at least one lens group reaches a reference position, and a determination device which determines an abnormal actuation based upon a detection by the detection device, upon actuation when the at least one lens group is moved from the retracted position to the position on the optical axis, wherein the determination device determines that the actuation is abnormal when the detection device detects that the at least one lens group reaches the reference position for a plurality of times.

4 Claims, 11 Drawing Sheets

FIG.2

| | | | IMAGE PICKUP AREA | | | | | | | | | | | | | | | | |
|---|---|---|---|---|---|---|---|---|---|---|---|---|---|---|---|---|---|---|---|
| | COLLAPSED POSITION | REFERENCE POSITION | WIDE ANGLE | | | | | | | | | | | | | | | | TELEPHOTO |
| | | | Zp1 | Zp2 | Zp3 | Zp4 | Zp5 | Zp6 | Zp7 | Zp8 | Zp9 | Zp10 | Zp11 | Zp12 | Zp13 | Zp14 | Zp15 | Zp16 | Zp17 |
| FIRST AND SECOND GROUPS LENS SYSTEM | −600 | 0 | 200 | 300 | 400 | 500 | 600 | 700 | 800 | 900 | 1000 | 1100 | 1200 | 1300 | 1400 | 1500 | 1600 | 1700 | 1800 |

… # LENS DRIVE CONTROL DEVICE AND IMAGE PICKUP DEVICE

TECHNICAL FIELD

The present invention relates to a lens drive control device for a lens barrel and an image pickup device employing the, lens drive control device.

BACKGROUND ART

In cameras, what is called, digital cameras and the like, or a mobile information terminal such as a mobile phone into which camera functions are incorporated, in many cases, for convenience in mobile, reduction in dimensions, in particular, reduction in thickness are required. In order to realize a reduction in thickness when being transported, the respective intervals between a plurality of lenses are reduced by employing a telescopic expandable and contractible structure, by employing, what is called, a retracting type structure, a structure in order to reduce the dimension in a direction of the optical axis for photographing or picking up an image, is widely used.

Recently, as a solution to further reduce the thickness of the lens barrel when retracting, there is provided a structure in which at least a part of lens groups or retracting lens groups, except for an object side (subject side) end portion among the plurality of lens groups, is retracted out of the optical axis for photographing, and a space is ensured in order to retract the at least a part of the lens group positioned in an object side than the retracting lens group at a photographing extended state, what is called, a retracting type lens barrel is often used.

Patent Literature 1 discloses an example of retracting type barrel. Operation, in particular, an actuating operation disclosed in Patent Literature 1 will be described with reference to FIGS. 8 and 9. FIG. 8 schematically shows the operation of the retracting lens group when an actuation is initiated. FIG. 8(*a*) is a back view when viewed from an imaging surface, and FIG. 8(*b*) is a plan view when viewed from an upper surface.

Further, FIG. 9 schematically shows an operation of a photointerrupter in which a retracted lens group is positioned in a retracted position or not. FIG. 9(*a*) is a schematic view in which the retracting lens group is positioned in the retracted position, and FIG. 9(*b*) is a schematic view in which the retracting lens group is positioned out of the retracted position.

As shown in FIG. 8, the retracting lens group RG is positioned at the retracted position A in a retracted and stored state. The operation of the retracting lens group RG is as follows. In a photographing extended state, a front lens group which is positioned in an object side than the retracting lens group RG on the optical axis for photographing is drawn out, after a space into which the retracting lens group RG is inserted, is defined on the optical axis for photographing, the retracting lens group RG makes a revolution from a retracted position A to a position B on the optical axis and moves along an arcuate track after the retracting lens group RG reaches a position B on the optical axis, the retracting lens group RG moves straight in a direction of the object along the optical axis for photographing and thus reaches a position C on the optical axis for photographing.

Further, as shown in FIG. 9, a lens retaining frame RH of the retracting lens group RG is provided with a protruding portion RP for shielding, as shown in FIG. 9(*a*), when the retracting retaining frame RH of the retracting lens group RG is in the retracted position, the protruding portion for shielding RP is adapted to shield the photointerrupter PI.

The drive of the retracting lens group RG is executed from the retracted and collapsed state shown in FIG. 9(*a*) to a position on the optical axis for photographing shown in FIG. 9(*b*) and thus the photointerrupter PI is adapted to be in a permeable state by breaking the protruding portion for shielding RP away from the photointerrupter PI. In this case, an output signal of the photointerrupter PI is used as a reference positional signal and a position where the reference positional signal changes when the protruding portion for shielding RP is brought away from the photointerrupter PI, is adapted to be a reference position.

As shown in FIG. 8, while the retracting lens group RG makes a revolution from the retracted position A to a position B on the optical axis, if this lens barrel, for example, a camera into which this lens barrel is incorporated, is swung, or the lens barrel is subjected to a large vibration, the lens retaining frame RH of the retracting lens retaining frame RG being moved, returns toward a direction of the retracted position, or interferes with other parts and so on. As a result of this, an idle phenomenon of a driven control called "out of step" occurs and there happens that the retracting lens group is unable to correctly position on the optical axis.

CITATION LIST

[Patent Literature]
  [PTL 1] JP-2006-330657-A

DISCLOSURE OF INVENTION

Problem to be Solved by the Invention

The present invention is made in consideration of the above-mentioned problems. Thus, the object of the present invention is to provide a lens drive control device for a lens barrel and an image pickup device employing the lens drive control device.

The object of the present invention is also to provide a lens drive control device which enables to detect, in particular, swing in the vicinity of the reference position of the retracting lens group when an actuation is initiated, and appropriately detect an abnormal actuating operation such as an interfere with other parts.

The object of the present invention is also to provide a lens drive control device which enables to detect, in particular, an idle run in the vicinity of the reference position of the retracting lens group when an actuation is initiated, and appropriately detect the abnormal actuating operation such as the interfere with other parts.

Further, the object of the present invention is to provide a lens drive control device which enables to detect, in particular, vibrations of the retracting lens group when an actuation is initiated, and appropriately detect that the actuation is abnormal.

Means for Solving the Problem

The lens drive control device of a preferred embodiment according to the present invention is as follows in order to achieve the above-mentioned objects.

A lens drive control device for a lens barrel, which controls at least a piece of a plurality of lens groups respectively including at least one lens,
  wherein a state of the lens barrel transits from a retracted state to a photographing extended state,
  the retracted state being a state in which the lens groups are stored by retracting at least one lens group of the lens groups to a retracted position which is off from an optical axis for photographing, and collapsing at least a part of the lens groups, the photographing extended state being a state in which said at least a part is moved in a direction of the optical axis for photographing, and the at least one lens group is moved from the retracted position to a position on the optical axis along which the at least one lens group is moved back and forth respectively, the lens drive control device comprising:

a detection device which detects that the at least one lens group reaches a reference position, the reference position being set on a track along which the at least one lens group is moved between the retracted position and the position on the optical axis, and a determination device which determines an abnormal actuation based upon a detection by the detection device, upon actuation when the at least one lens group is moved from the retracted position to the position on the optical axis, wherein the determination device determines that the actuation is abnormal when the detection device detects that the at least one lens group reaches the reference position for a plurality of times.

The lens drive control device of another preferred embodiment according to the present invention is as follows in order to achieve the above-mentioned objects.

A lens drive control device for a lens barrel, which controls at least a piece of a plurality of lens groups respectively including at least one lens, wherein a state of the lens barrel transits from a retracted state to a photographing extended state, the retracted state being a state in which the lens groups are stored by retracting at least one lens group of the lens groups to a retracted position which is off from an optical axis for photographing, and collapsing at least a part of the lens groups, the photographing extended state being a state in which said at least a part is moved in a direction of the optical axis for photographing, and the at least one lens group is moved from the retracted position to a position on the optical axis along which the at least one lens group is moved back and forth respectively, the lens drive control device comprising:

a detection device which detects that the at least one lens group reaches a reference position, the reference position being set on a track along which the at least one lens group is moved between the retracted position and the position on the optical axis, a drive control amount detection device which detects a drive control amount of the at least one lens group of the lens groups, and a determination device which determines an abnormal actuation based upon a detection by the detection device and a detection by the drive control amount detection device, upon actuation when the at least one lens group is moved from the retracted position to the position on the optical axis, wherein the determination device determines that the actuation is abnormal when the drive control amount detected by the drive control amount detection device until the detection device detects that the at least one lens group has reached the reference position, is more than a predetermined value.

The lens drive control device of still another preferred embodiment according to the present invention is as follows in order to achieve the above-mentioned objects.

A lens drive control device for a lens barrel, which controls at least a piece of a plurality of lens groups respectively including at least one lens, wherein a state of the lens barrel transits from a retracted state to a photographing extended state, the retracted state being a state in which the lens groups are moved by retracting at least one lens group of the lens groups to a retracted position which is off from an optical axis for photographing, and collapsing at least a part of the lens groups, the photographing extended state being a state in which said at least a part is moved in a direction of the optical axis for photographing, and the at least one lens group is moved from the retracted position to a position on the optical axis along which the at least one lens group is moved back and forth respectively, the lens drive control device comprising:

a vibration amount detection device which detects a vibration amount, and a determination device which determines an abnormal actuation based upon a detection by the vibration amount detection device, upon actuation when the at least one lens group is moved from the retracted position to the position on the optical axis, wherein the determination device determines that the actuation is abnormal when the vibration amount detected by the vibration amount detection device is more than a predetermined value.

According to a fourth aspect of the present invention, if the determination device determines that the actuation is abnormal, it further comprises an actuation reset device which executes an actuating operation which returns the at least one lens group to the retracted position and again moves the at least one lens group from the retracted position to the position on the optical axis for photographing, in particular.

According to a fifth aspect of the present invention, if the determination device determines that the actuation is abnormal, by returning the at least one lens group to the retracted position and collapsing said at least a part so as to make the lens barrel be in the retracted state.

According to a sixth aspect of the present invention, if the determination device determines that the actuating operation executed by the actuation reset device is abnormal when restarting operation is executed, the actuation reset device further comprises a device for interrupting the restarting actuation and further repeatedly executing the restarting actuation.

Further, according to a seventh aspect of the present invention, it further comprises a device for stopping the restarting actuation, if the actuation is repeated for a predetermined number of times, in particular.

According to an eighth aspect of the present invention, it further comprises a lens drive device for driving the at least one lens group by using a pulse motor.

According to a ninth aspect of the present invention, it further comprises a reference position detection device which detects that the at least one lens group of the lens groups reaches a reference position, the reference position being set on a track along which the at least one lens group is moved between the retracted position and a predetermined position on the optical axis for photographing, wherein if the determination device determines that the actuation is abnormal when the vibration amount detected by the vibration amount detection device is more than the predetermined value after the reference position detection device detects that the at least one lens group has reached the reference position.

According to a tenth aspect of the lens drive control device of the present invention, if the determination device determines that the actuation is abnormal, the actuation reset device returns said at least a part of the lens groups to the collapsed position after the vibration amount detection device detects that a stationary state continues for a predetermined period.

According to an aspect of an image pickup device of the present invention, the image pickup device comprises any one of the lens drive devices as described above.

Effects of the Invention

According to a first aspect of the present invention, it is possible to appropriately detect the abnormal actuating operation such as a pivoting action in the vicinity of the reference position of the retracting lens groups when the actuation is initiated, or an interference action of the retracting lens groups with other parts and the like.

According to a second aspect of the present invention, it is possible to appropriately detect the abnormal actuating operation such as an idle run and the like of the retracting lens groups when the actuation is initiated.

According to a third aspect of the present invention, it is possible to detect the vibration amount of the retracting lens groups when the actuation is initiated and thus appropriately determine that the actuation is abnormal.

According to a fourth aspect of the present invention, it is possible to reset the actuation operation and thus prevent the abnormal restarting operation, when the actuation of the retracting lens group is abnormal in initiating actuation.

According to a fifth aspect of the present invention, it is possible to collapse said at least a part of the lens groups and thus prevent the abnormal restarting.

According to a sixth aspect of the present invention, it is possible to reset the actuation operation and thus prevent the abnormal restarting operation, when the actuation of the retracting lens group is abnormal in restarting actuation.

Further, according to a seventh aspect of the present invention, it is possible to prevent an extreme number of repetitions of the resetting actuation when the actuation initiation of the retracting lens group is abnormal in restarting actuation.

According to an eighth aspect of the present invention, it is possible to particularly perform a high degree of precision in controlling positions of the retracting lens groups.

According to a ninth aspect of the present invention, it is possible to appropriately determine that the actuation is abnormal, based upon the vibration amount detection in the vicinity of the reference position of the retracted lens groups.

According to a tenth aspect of the lens drive control device of the present invention, it is possible to particularly detect the abnormal actuation of the retracting lens groups and thus prevent an actuation failure.

According to an aspect of an image pickup device of the present invention, it is possible to appropriately detect the abnormal actuations such as a swinging action of the retracting lens groups when the actuation is initiated, or an interference action of the retracting lens groups with other parts and the like and thus avoid the abnormal restarting actuations.

BRIEF DESCRIPTION OF DRAWINGS

FIG. 2 is a view illustrating the relationship between the detecting pulses of driven control amounts of first and second groups lens system and zooming positions thereof.

MODE FOR CARRYING OUT THE INVENTION

First Embodiment

Figure 1:
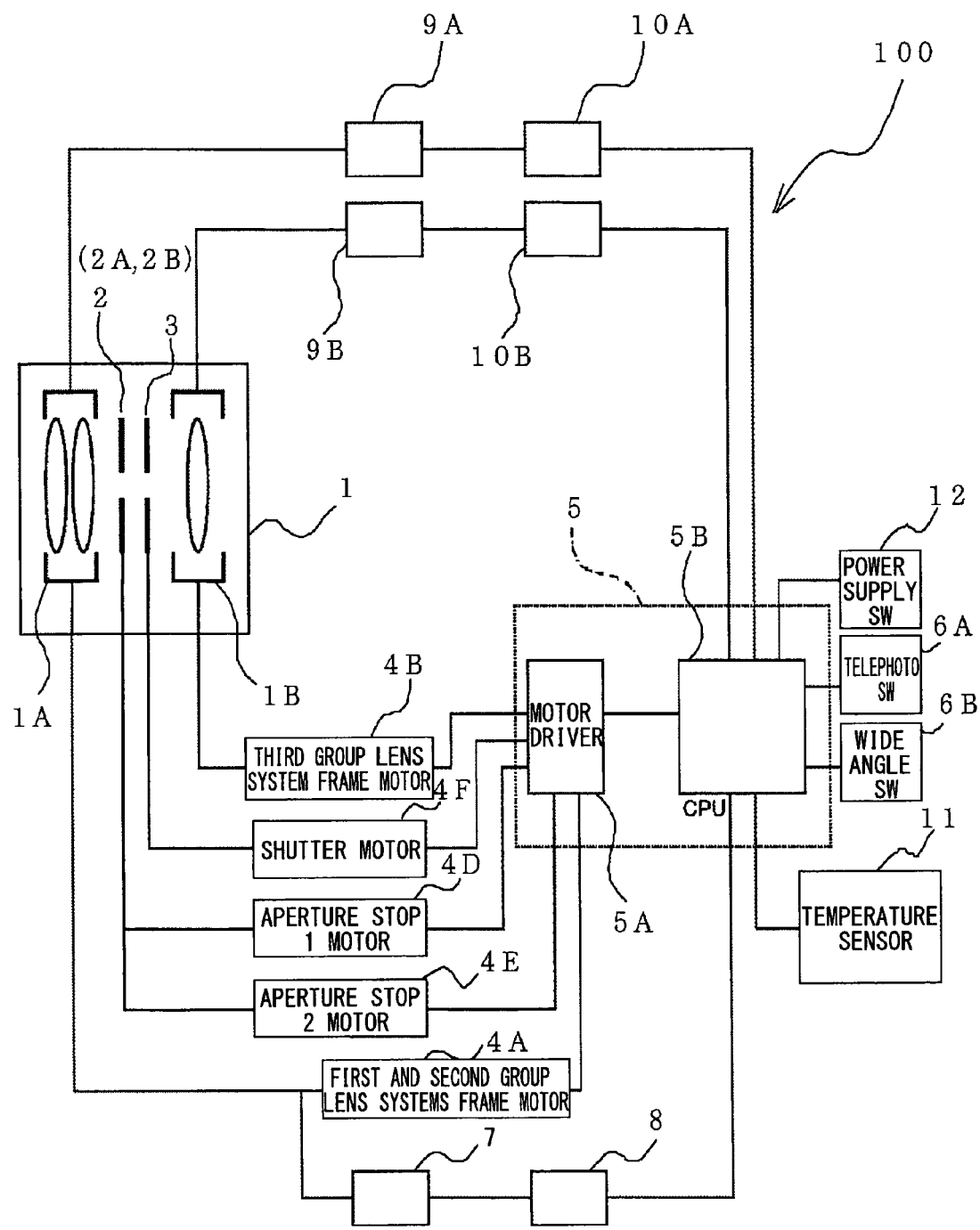
FIG. 1 is a schematic block diagram illustrating a hardware structure of the lens drive control device according to the present invention.

Referring now to the drawings, a lens drive control device for a lens barrel according to the present invention will be described in detail based on the following embodiments of the present invention.

The lens drive control device 100 shown in FIG. 1 is typically used by incorporating into a camera (an image pickup device) such as digital cameras and the like and includes an image pickup lens 1, an aperture stop 2, a shutter 3, a first and second groups lens system frame motor 4A, a third group lens system frame motor 4B, a first aperture stop motor 4D, a second aperture stop motor 4E, a shutter motor 4F, a control device 5, a telephoto switch 6A, a wide angular switch 6B, a detection device for detecting a driven control amount of the first and second groups lens system 7, a drive circuit for the driven control amount detection device of the first and second groups lens system 8, a detection device for detecting a position of the first and second groups lens system 9A, a detection device for detecting a position of the third group lens system 9B, a drive circuit for the position detection device of the first and second groups lens system 10A, a drive circuit for the position detection device of the third group lens system 10B, a temperature sensor 11, and a power supply switch 12.

The image pickup lens 1 comprises a plurality of lens groups each lens group including one or more lens, as an optical lens system. In this case, the image pickup lens 1 comprises first and second groups lens system 1A and a third group lens system 1B. An aperture stop 2 and a shutter 3 are interposed between these first and second groups lens system 1A and third group lens system 1B. The aperture stop is not clearly shown but includes a first aperture stop 2A and second aperture stop 2B. The control device 5 includes a motor driver 5A and a CPU (Central Processing Unit). The motor driver 5A drives the first and second groups lens system frame motor 4A, the third group lens system frame motor 4B, the first aperture stop motor 4D, the second aperture stop motor 4E and the shutter motor 4F. The CPU 5B controls the motor driver 5A, the drive circuit for the driven control amount detection device of the first and second groups lens system 8, the drive circuit for the position detection device of the first and second groups lens system 10A, and the drive circuit for the position detection device of the third group lens system 10B. Connected to the CPU 5B are the telephoto switch 6A and the wide angular switch 6B as switches for zooming, the temperature sensor 11, the power supply switch 12 and the like.

In the lens drive control system 100, the image pickup lens 1 comprises three lens groups each lens group including one or more lens from an object or an object surface side which faces the subject to be photographed, the first group lens system (the first group), the second group lens system (the second group), and the third group lens system (the third group lens system) are arranged in sequence. Wherein the first group lens system or the first group and the second group lens system or the second group are integrally used and constitutes the first and second groups lens system 1A. In this case, the first and second groups lens system 1A are adapted to be integrally moved and vary the relative distance between a plurality of lens included in each group, respectively, for example, by operating through a cam of different shape with the common drive system. The third group lens system itself constitutes the third group lens system 1B as a retracting lens group.

The first and second groups lens system 1A and the third group lens system 1B are disposed on a common optical axis for picking up an image for the lens barrel at the photographing extended state. Wherein, behind the first and second groups lens system are arranged the aperture stop 2 comprised of the first aperture stop 2A and the second aperture stop 2B, which controls the light volume passing through the image pickup lens from the subject, and the shutter 3 which controls the exposure time when photographing.

The first and second groups lens system 1A are lens groups for zooming to change, for example, an imaging magnification or a focal distance. The third group lens system 1B is a lens group for focusing to focus an optical image of the subject which is imaged by the image pickup lens 1, on an exposure surface (not shown) located behind the third group lens system 1B. The first and second groups lens system 1A and the third group lens system 1B behind it are driven by the first and second groups lens system frame motor 4A and the third group lens system frame motor 4B, respectively, and, in a photographing extended state, are moved parallel to the optical axis along which these lens groups are moved back and forth in the photographing extended state to establish a targeted optical system.

Figure 8A:
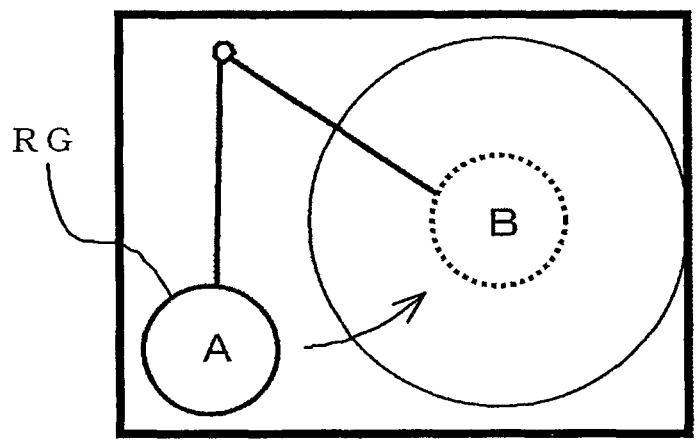
FIG. 8 is a schematic view of the operation of a retracting lens group when an actuation is initiated, wherein (a) is a back view when viewed from an image forming surface side, and (b) is a plan view when viewed from an upper surface.
Figure 8B:
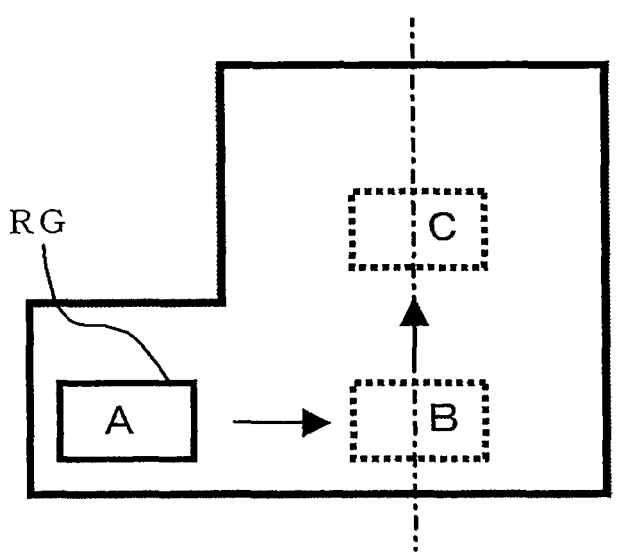
Figure 9A:
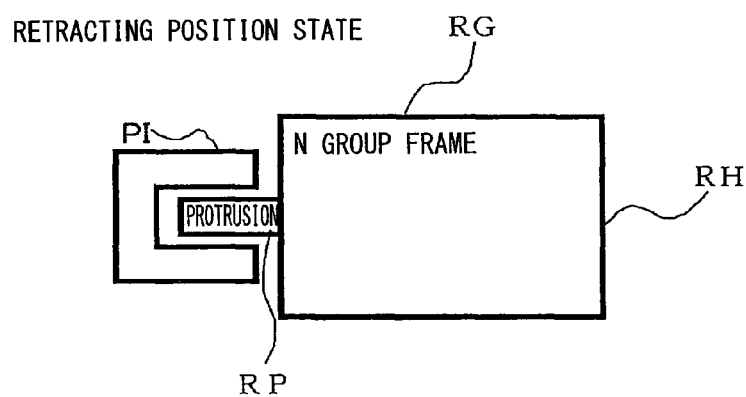
FIG. 9 is a schematic view of an operation of a photointerrupter in which the retracted lens group is positioned in the retracted position or not, wherein (a) is a schematic view in which the retracting lens group is positioned in the retracted position, and (b) is a schematic view in which the retracting lens group is positioned out of the retracted position.
Figure 9B:
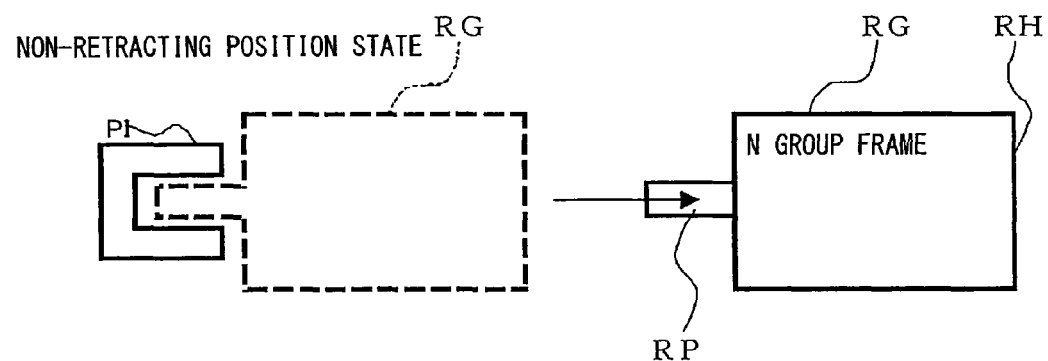

Further, in a non-photographing extended state such as when being transported and the like, the first and second groups lens system are in a retracted state or a collapsed state, as shown in FIG. 8, when moving from the photographing extended state to the collapsed state, after the retracting lens group or the third group lens system 1B is retracted to an image forming plane direction (a direction away from the object or the subject) or along the optical axis in the photographing extended state, the first and second groups lens system are collapsed to a position out of the optical axis in the photographing extended state (known as a retracting operation) and thus the first and second groups lens system are collapsed into a space created on the optical axis in the photographing extended state by retracting the third group lens system 1B, thereby achieving further reduction in thickness of the camera by shortening the dimension along the optical axis in the photographing extended state.

Meanwhile, when moving from the collapsed state to the photographing extended state, the first and second groups lens system 1A are moved in a direction of the object (namely, a direction in a closer position to the subject) and create a space behind it, the third group lens system 1B is entered in this space and is positioned on the optical axis in the photographing extended state, and then is moved in a direction of the object along the optical axis in the photographing extended state so as to be in a waiting state for photographing. In addition, the third group lens system between the retracting position and a position on the optical axis in the photographing extended state may be moved by the rotation about another axis which is out of the optical axis for the photographing extended state and substantially parallel to this optical axis, or may be moved by the straight motion along a straight line perpendicular to the optical axis for the photographing extended state.

Herein, as the first and second groups lens system frame motor 4A which drives the first and second groups lens system 1A, DC (direct current) motor is employed. As the third group lens system frame motor 4B which drives the third group lens system 1B, a pulse motor is employed (with respect to the drive mechanism and the like, since the special structure is not necessary used, thus be omitted).

The DC motor is a motor in which a drive speed changes in response to the drive voltage to be applied, so that only a simple operation such as changing the voltage to be applied can adjust the drive speed which drives the first and second groups lens system 1A.

Further, the DC motor can generally rotate faster than the pulse motor if the supplying power is equivalent. Furthermore, since it has the property that the drive current changes in response to the change of load, the drive current increases as the load increases, as a result the drive torque increases, the DC motor can obtain the drive motion property that is durable against the load variation and is smooth. Therefore, it is preferable for the drive such as the inclination of the cam to change in response to the zooming position and thus the load torque changes therewith, for example, the drive of the cam cylinder for drawing out the lens group.

Further, the DC motor is a motor in which the drive speed changes in response to the duty ratio (a ratio of on-state over a period), so that only a simple operation such as changing the ratio of turning on the driving power which is supplied to the DC motor can adjust the drive speed which drives the first and second groups lens system 1A.

On the contrary, when stopping the DC motor, since the occurrence of the offset from the initiation of the stopping control to the actual stopping due to the inertia is inevitable, what is known as overrun, therefore, it is difficult to correctly stop in the desired position. In this respect, since the pulse motor drives in a stepped manner by applying pulses, it is easy to stop at an arbitrary target position but it is not so strong against the torque variation, and thus it is preferable in terms of control in a case when the torque variation is scarce (small).

Further, the first aperture stop motor 4D, the second aperture stop motor 4, and the shutter motor 4F are provided in order to drive the first aperture stop 2A, the second aperture stop 2B, and the shutter 3, respectively. The actuations of these first aperture stop motor 4D, second aperture stop motor 4, and shutter motor 4F are the same with respect to the drive mechanism and the like, and since a special structure is not necessary used, a description omitted.

Furthermore, each motor of the first and second groups lens system frame motor 4A, the third group lens system frame motor 4B, the first aperture stop motor 4D, the second aperture stop motor 4E, and the shutter motor 4F is electrically connected to the motor driver 5A and thus is intensively controlled by the motor driver 5A. The motor driver 5A is electrically connected to the CPU 5B and thus obtains necessary information in order to perform the drive control of the first and second groups lens system frame motor 4A, the third group lens system motor 4B, the first aperture stop motor 4D, the second aperture stop motor 4E, and the shutter motor 4F, for example, the information of the drive voltage, the drive timing, the driven control amount, the drive direction or the like. And, based upon such information obtained from the CPU 5B, the motor driver 5B performs the drive control of each motor of the first and second groups lens system frame motor 4A, the third group lens system frame motor 4B, the first aperture stop motor 4D, the second aperture stop motor 4E, and the shutter motor 4F.

Further, provided on the first and second groups lens system frame motor 4A is a detection device for detecting a driven control amount of the first and second groups lens system 7. The driven control amount detection device of the first and second groups lens system 7 is electrically connected to a drive circuit for the driven control amount detection device of the first and second groups lens system 8 and is driven by the drive circuit for the driven control amount detection device of the first and second groups lens system. Pulses which are output by the driven control amount detection device of the first and second groups lens system 7 and respond to the rotation thereof are taken in the CPU 5B.

The driven control amount detection device of the first and second groups lens system 7 is set to output pulses or predetermined pulses, in this case, for example, 1280 pulses, the image pickup lens 1 in between a most telephoto state and a most wide angular state. The whole section between the most telephoto state and the most wide angular state is divided into a predetermined number, for example, into 16 equally sections in which each section corresponds to 80 pulses. Set to 17 delimitations of the 16 sections are positional indices, known as zooming positions, Zp1, Zp2, . . . , Zp17.

Herein, an example of the relationship between output pulses of the driven control amount detection device of the first and second groups lens system 7 and the zooming positions from Zp1 to Zp17 will be shown in FIG. 2. The number of pulses shown in FIG. 2, as the reference position being counted as 0, the wide angular end being counted as 200 pulses, the telephoto end being counted as 1800 pulses, there are 1800 pulses between the wide angular end and telephoto end, the interval between the wide angular end and telephoto end is divided into 16 equally sections in which each section corresponds to 100 pulses.

Therefore, zooming positions Zp1, Zp2, . . . , Zp17 correspond to 200, 300, . . . , 1800 pulses, respectively. When viewed from the reference position to the collapsed position, since it is counted as a negative value, the collapsed position corresponds to minus (−) 600 pulses.

Meanwhile, the third group lens system frame motor 4B is driven by the driven control amount and driven speed corresponding to the number of pulses input from the motor driver 5A in accordance with the indications from the CPU 5B.

In addition, the first and second groups lens system 1A comprise a detection device for detecting a position of the first and second groups lens system 9A which detects the reference position thereof, and the third group lens system 1B comprises a detection device for detecting a position of the third group lens system 1B which detects the reference position thereof. Thereby, it is detected whether the first and second groups lens system 1A and the third group lens system 1B are positioned in the respective reference positions or not.

Figure 3:
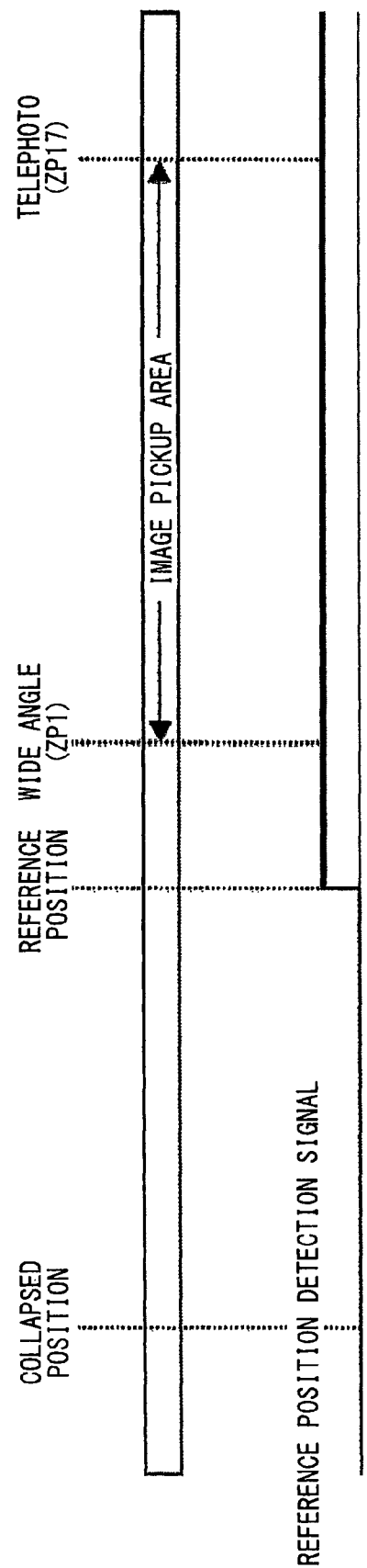
FIG. 3 is a view illustrating the relationship between the positions of the first and second groups lens system and the reference position detection signal of the first and second groups lens system.
Figure 4:
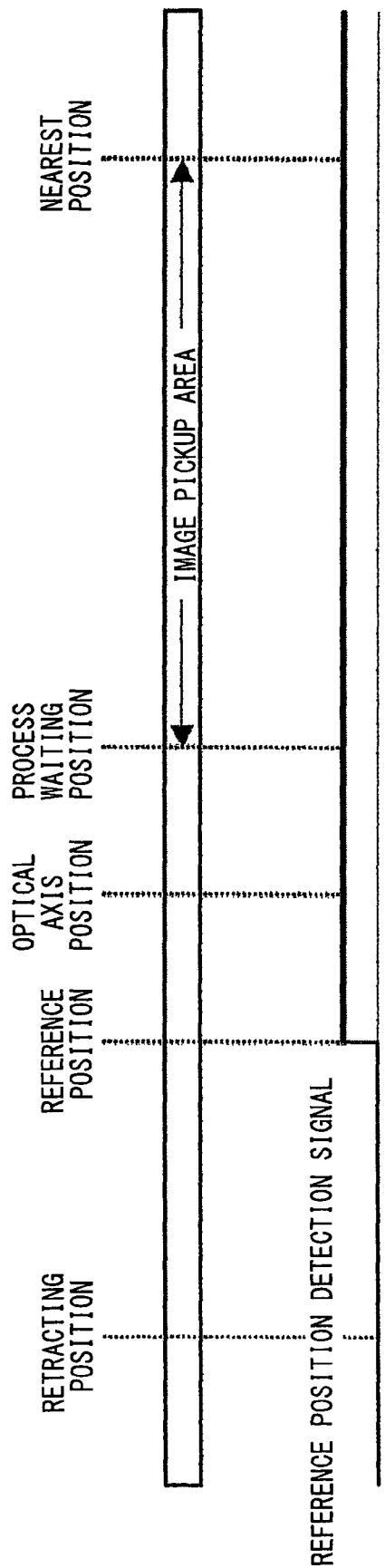
FIG. 4 is a view illustrating the relationship between the positions of the third group lens system and the reference position detection signal of the third group lens system.

In FIG. 3, one example of the relationship between the position of the first and second groups lens system 1A and the reference position detection signal output by the position detection device of the first and second groups lens system 9A is shown. Also, in FIG. 4, one example of the relationship between the position of the third group lens system 1B and the reference position signal output by the position detection device of the third group lens system 9B is shown.

These position detection device of the first and second groups lens system 9A and position detection device of the third group lens system 9B are driven by a drive circuit for the position detection device of the first and second groups lens system 9A and a drive circuit for the position detection device of the third group lens system 9B, respectively. In addition, the positional information detected by the drive circuit for the position detection device of the first and second groups lens system 10A and the drive circuit for the position detection device of the third group lens system 10B is taken in the CPU 5B.

Electrically connected to the CPU 5B are a telephoto switch (telephoto SW) 6A as a zooming switch which lengthens the focal distance of the image pickup lens 1 and operates in order to make the magnification high when photographing a telephoto image, and a wide angular switch (wide angular SW) 6B as a zooming switch which shortens the focal distance of the image pickup lens 1 and operates in order to make the magnification low when photographing a wide angular image.

If these telephoto switch 6A and wide angular switch 6B are operated, the CPU 5B controls the first and second groups lens system frame motor 4A and the third group lens system frame motor 4B, respectively, in response to the operations of the telephoto switch 6A and the wide angular switch 6B.

In addition, the first group and second group which constitute the first and second groups lens system 1A engages the cam cylinder (not shown) in which an interval between these two groups is mechanically adjusted by the cam mechanism. When the first and second groups lens system 1A is driven by the first and second groups lens system frame motor 4A, the first group and second group each follows a predetermined motion track, respectively, and thus, the first group and the second group are mechanically driven so that the interval between the first group and the second group is made to be the predetermined interval (variable interval or constant interval).

Further, the temperature sensor 11 is connected to the CPU 5B. The temperature sensor 11 outputs the voltage signal which changes in response to the temperature. The CPU 5B takes the information concerning the temperature by A/D converting this voltage signal. In this embodiment, if the temperature sensor 11 has a characteristic of, for example, changing 10 mV per 1 degree, by previously storing voltage values corresponding to various temperatures based upon such a characteristic in the CPU 5B or the temperature sensor 11, thereby enabling a user to grasp the current temperature.

Figure 5:
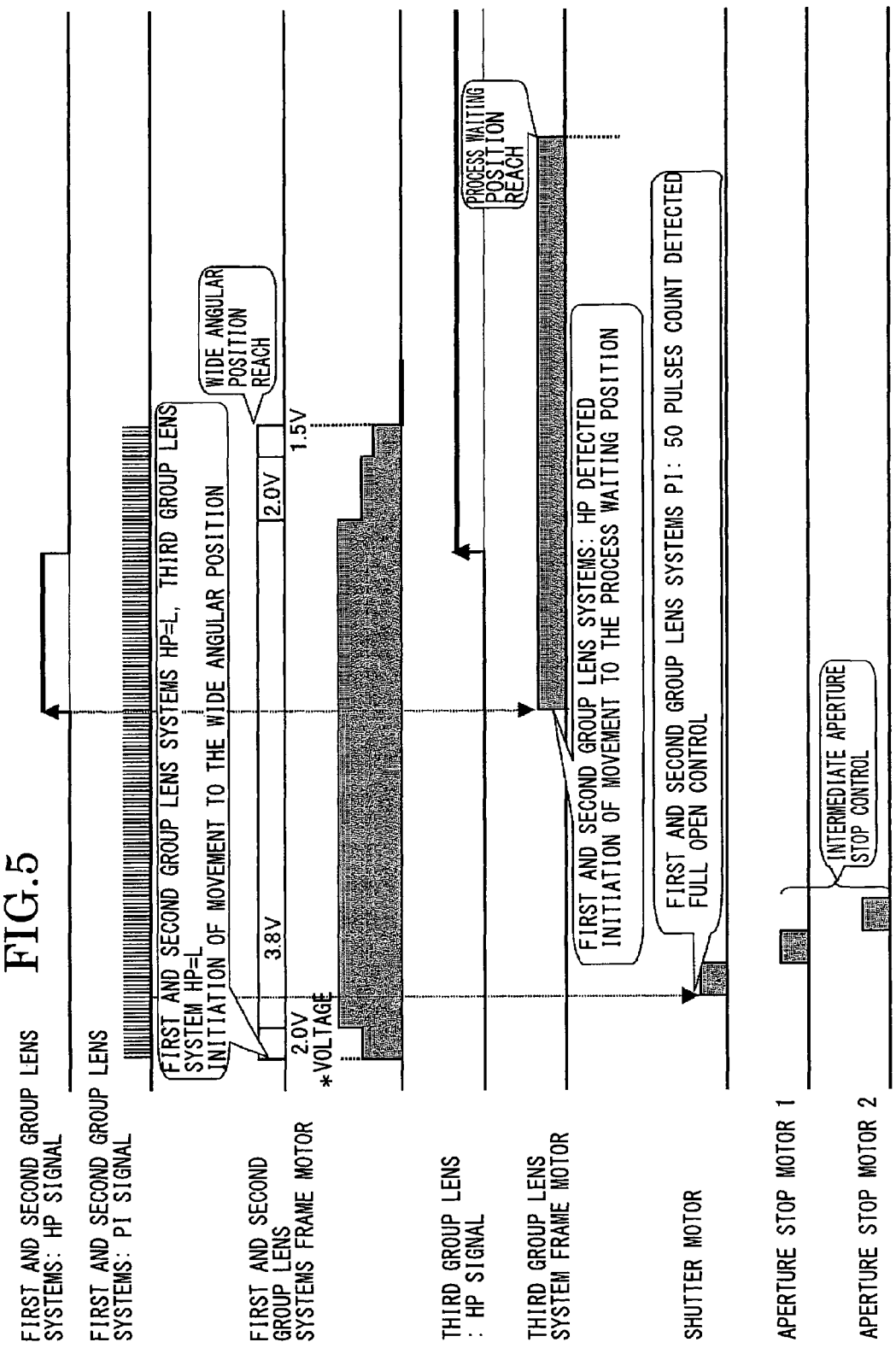
FIG. 5 is a timing chart illustrating the actuating operation in which the lens barrel moves from the retracted state and collapsed state to the photographing extended state.

Next, the actuating operation of moving such a lens barrel from the retracted state and the collapsed state to the photographing waiting state will be described with reference to a timing chart of FIG. 5.

When the control of the lens barrel is initiated, first of all, an initial setting of each portion of the lens barrel is initiated. In an initial setting, the initiation of the motor driver for driving the motor system and the initiation of the position detection device are initialized. Namely, the motor driver 5A which drives each motor of the first and second groups lens system frame motor 4A, the third group lens system frame motor 4B, the first aperture stop motor 4D, the second aperture stop motor 4E and the shutter motor 4F is initialized. And, the position detection device of the first and second groups lens system 9A and the position detection device of the third group lens system are initialized.

The detection result of the position detection device of the first and second groups lens system 9A shows that the first and second groups lens system 1A does not reach the reference position but reside in the collapsed position or the first and second groups lens system 1A reach the reference position.

The detection result of the position detection device of the third group lens system 9B shows that the third group lens system 1B does not reach the reference position but resides in the retracted position or the third group lens system 1B reaches the reference position. If the detection result of the position detection device of the first and second groups lens system 9A shows that the first and second groups lens system 1A resides in the stored position and the detection result of the position detection device of the third group lens system 9B shows that the third group lens system 1B resides in the reference position, the first and second groups lens system frame motor 4A comprising the DC motor is driven to move the first and second groups lens system 1A toward the wide angular position.

The driven control amount of the first and second groups lens system 1A driven by the first and second groups lens system frame motor 4A is detected by the driven control amount detection device of the first and second groups lens system 7. The driven control amount detection device of the first and second groups lens system 7 detects the driven control amount of the first and second groups lens system 1A based upon the driven control amount of the first and second groups lens system 1A output by the first and second groups lens system frame motor 4A. The driven control amount detection device of the first and second groups lens system 7, for example, the outer circumferential portion of a slit-like disk in which shielding portions and permeable portions are alternately formed in the rotating portion of the drive transmission system such as the axis of rotation and the like of the first and second groups lens system frame motor 4A is inserted into a photointerrupter (PI), and the rotary encoder which outputs pulse-like signals every constant rotation amount as the output of the photointerrupter is composed, thereby, the driven control amount is detected by counting an edge portion of the output signal (PI signal) of the photointerrupter.

In a predetermined actuation period right after the initiation of actuation of the first and second groups lens system frame motor 4A, the drive voltage is set to be lower (for example, 2.0V) than the stationary state voltage (for example, 3.8 V) in order to prevent an incoming current by the DC motor. After the actuation period has lapsed, the drive voltage is increased to the stationary state voltage.

From the actuation of the first and second groups lens system frame motor 4A, it lapses 50 ms (for example, corresponding to 50 pulses of PI signal), the shutter motor 4F executes full open control of the shutter 3 to set the shutter in a full open state. Next, the aperture stop is set in an intermediately restricted state by the first aperture stop motor 4F and the second aperture stop motor 4E to thereby set the aperture stop 2 comprising the first aperture stop 2A and the second aperture stop 2B in an intermediately aperture stop degree or an intermediately aperture stop state. During the drive of the shutter motor 4F, as well as the first aperture stop motor 4D and the second aperture stop motor 4E, the first and second groups lens system motor 4A is driving. During this period, the first and second groups lens system 1A, the shutter 3, and the aperture stop 2 are simultaneously driven.

If the restriction of the aperture stop is completed, a process waiting state for detecting the reference position by the position detection device of the first and second groups lens system 9A is executed. A place where the reference position signal (HP (Home Position)) output by the position detection device of the first and second groups lens system 9A changes from the L (Low level) to the H (High level) (a position changing from the L to the H) becomes the reference position or HP position of the first and second groups lens system 1A.

If the reference position (HP) of the first and second groups lens system 1A is detected, the positional information concerning the first and second groups lens system 1A is reset. This position is made as a reference position and thus by counting pulse-like signal output by the detection device for detecting the driven control amount of the first and second groups lens system 7, the driven control amount from the reference position to the wide angular end position (wide position) of the first and second groups lens system 1A is detected and the control of the first and second groups lens system 1A is executed. Although the wide angular end position is previously set and stored, it can be stored and thus is rewritten by employing a nonvolatile memory such as an EEPROM (electrically erasable program read only memory) and the like, as a storing medium.

And, during the period of the predetermined pulses, the stopping control process is executed. The drive voltage of the first and second groups lens system frame motor 4A is gradually lowered in response to the remaining number of pulses up to the wide angular end position. Such a control reduces the occurrence of overrun when the system reaches the wide angular end position. The detection signal output by the driven control amount detection device of the first and second groups lens system is counted and if it is detected that the first and second group lens system 1A reaches the wide angular end position, the brake control in order to stop the drive of the first and second groups lens system 1A is executed. The overrun amount during this brake control is counted and thus the final position of the first and second groups lens system 1A is determined.

Further, during the drive control of the first and second groups lens system 1A by the first and second groups lens system frame motor 4A, if the position detection device of the first and second groups lens system 9A detects that the first and second groups lens system 1A is positioned in the reference position, the drive of the third group lens system 1B to the photographing waiting state position by the third group lens system frame motor 4B is initiated. At this moment, since the drive control of the first and second groups lens system 1A by the first and second groups lens system frame motor 4A is also executed until the first and second groups lens system 1A reach the wide angular end position, the drive controls of the first and second groups lens system 1A and the third group lens system 1B are simultaneously and side by side executed.

Meanwhile, in this case, as the third group lens system frame motor 4B, for example, the pulse motor is used. By setting the pulse rate of the third group lens system frame motor 4B higher than the normal drive, the drive time of the third group lens system frame motor 4B is adapted to be shorten. And, as the drive control of the third group lens system frame motor 4B, the process waiting state for detecting the reference position is executed.

A place where the reference position signal (HP(Home Position)) output by the position detection device of the third group lens system 9B changes from the L (Low level) to the H (High level) becomes the reference position (HP position) of the third group lens system. If the reference position is detected by the position signal output by the position detection device of the third group lens system 9B, the positional information of the third group lens system 1B is reset. This position is made as the reference position and thus the driven control amount from this reference position to the photographing process waiting state position is pulse-driven by the third group lens system frame motor 4B comprising the pulse motor. Although the photographing process waiting state position is previously set and stored, it can be stored and thus is rewritten by employing a nonvolatile memory such as an EEPROM and the like, as a storing medium.

Further, in this case, since the required current value at a steady state of the first and second groups lens system frame motor 4A employing the DC motor, among the first and second groups lens system frame motor 4A, the third group lens system frame motor 4B, the first aperture stop motor 4D, the second aperture stop motor 4E, and the shutter motor 4F, is most low, a simultaneous drive timing is set to overlap the steady state of the first and second groups lens system frame motor 4A. Namely, the drive of the first and second groups lens system frame motor 4A is controlled so that the first and second groups lens system frame motor 4A and the shutter motor 4F, the first and second groups lens system frame motor 4A and the second aperture stop motor 4D, the first and second groups lens system frame motor 4A and the second aperture stop motor 4E, and the first and second groups lens system frame motor 4A and the third group lens system frame motor 4B, are simultaneously driven, respectively.

By the way, in this embodiment, the current value at a steady state of the first and second groups lens system frame motor 4A of the DC motor is approximately 125 mA, the current value at a steady state of the third group lens system frame motor 4B of the pulse motor is approximately 185 mA, the current value at a steady state of the shutter motor 4F is approximately 160 mA, each of the current value at a steady state of the first aperture stop motor 4D and the second aperture stop motor 4E is approximately 200 mA.

Next, in the lens drive control device of a first embodiment according to the present invention, the third group lens system 1B is driven from the retracting position (A) to the photographing waiting position (C).

First of all, based upon the reference position signal output by the position detection device of the third group lens system 9B, the retracting determination is executed (Step S101). In the retracting determination at Step S101, if the reference position signal output by the position detection device of the third group lens system 9B is H (High), since the third group lens system 1B is in a position from the reference position to the photographing extended state, although the actuation control of the third group lens system 1B is in an initial state, it is determined that the third group lens system 1B is in a non-retracting state (the third group lens system is not returned to the retracting state) and thus the retracting process is executed (Step S102). In the retracting process at Step S102, the third group lens system 1B is moved to a retracted position prior to the reference position (a position from the retracted and stored state to the reference position). Thereafter, the third group lens system is returned to a start position or at Step S101, the retracting determination is executed by the position detection device of the third group lens system 9B, and the retracting process is repeated until it is determined that the third group lens system is in a retracting state at Step S101. Since the retracting process itself is not directly concerned with the purpose of the present invention, thus the detailed description will be omitted.

In the retracting determination at Step S101, if the reference position signal output by the position detection device of the third group lens system 9B is L (Low), since the third group lens system 1B is in a position from the retracted and stored state to the reference position, it is determined that the third group lens system 1B is in a retracting state and thus essentially the actuation process is initiated. That is to say, more specifically, in the retracting determination at Step S101, if the reference position signal output by the position detecting device of the third group lens system 9B is L (Low) and thus it is determined that the third group lens system 1B is in a retracting state, and thus the third group lens system 1B is moved in a direction of the optical axis for photographing.

Thereafter, the reference position detection determination of the third group lens system 1B is executed by the position detection device of the third group lens system 9B (Step S104). In the reference position detection determination at Step S104, if the reference position (a position where the reference position signal changes from L (Low) to H (High)) is not detected, a process waiting state for detecting the reference position is executed.

During the drive of the third group lens system 1B by the third group lens system frame motor 4B, the driven control amount is counted based upon the number of driven pulses of a pulse motor or the third group lens system frame motor 4B and thus the driven control amount of the third group lens system 1B is monitored.

In the reference position detection determination at Step S104, if the reference position is not detected, the driven control amount is determined by the number of counted driven pulses of the third group lens system frame motor 3B (Step S105). In the driven control amount determination at Step S105, if the counted driven control amount is less than the number of a predetermined pulses (namely, the counted driven control amount does not reach the number of the predetermined pulses), Step S104 and Step S105 are alternately repeated and a process waiting state for detecting the reference position of the third group lens system is executed until the reference position of the third group lens system 1B is detected. In the driven control amount determination at Step S105, if the counted driven control amount reaches the number of the predetermined pulses, since the counted driven control amount reaches the number of the predetermined pulses at Step S105 in a state that the reference position is not detected at Step S104, an error process is executed (Step S106). In this case, although the drive corresponding to the predetermined driven control amount is executed, the third group lens system does not reach the reference position. Therefore, since it is considered that any errors with respect to the driven control would occur, the error process must be executed. In the error process at Step S106, the drive of the third group lens system frame motor 4B is stopped and then the process is completed by executing, for example, the error displaying process and the like.

In the reference position detection determination at Step S104, if the reference position (a position where the reference position signal changes from L (Low) to H (High)) is detected, the number of counted driven pulses of the third group lens system frame motor 4B or the number of counted driven control amount of the third group lens system 1B is reset to zero (0), the drive of the third group lens system 1B to a photographing waiting state position is initiated (Step S107), and the driven control amount is counted (Step S108). In this way, 500 pulses which correspond to the driven control amount from the reference position of the third group lens system 1B to the photographing waiting state position is counted, a process waiting state for detecting that the third group lens system 1B is driven to the stopping position, namely, the photographing waiting state position, is executed (Step S109).

In the stopping position detection determination of the third group lens system 1B at Step S109, if the third group lens system does not reach the stopping position, namely, the number of 500 pulses is not detected, the reference position detection determination of the third group lens system 1B is executed by the position detection device of the third group lens system 9B (Step S110). In this Step S110, on the contrary to Step S104, the third group lens system 1B is returned to the reference position after it is initiated to move from the reference position, wherein it is determined whether the reference position signal of the position detection device of the third group lens system 9B changes H (High) to L (Low). In the reference position detection determination at Step S110, if the reference position is not detected, then the process is returned to the Step S108, while the driven control amount (the number of driven pulses) is counted, at the Step S109, it is determined whether the drive of the third group lens system 1B to the stopping position is detected or not, if it is not detected, the process is returned to the Step S110 and the process waiting state for detecting the stopping position is executed.

In the reference position detection determination at Step S110, if the reference position signal changes H (High) to L (Low), since this means that the third group lens system 1B is returned to the retracting position in a moment by the vibration and the like, the drive of the third group lens system 1B is stopped as an abnormal actuating operation (Step S111). Thereafter, in the actuation reset determination as to whether the number of resets is less than the predetermined number or not, the number of resets is determined (Step S112). In the actuation reset determination at Step S112, if the number of resets is less than the predetermined value (number), a process waiting for one second is executed (Step S113), thereafter, the retracting process of the third group lens system 1B is executed and then the number of resets is incremented by plus one (+1) (Step S114). In the retracting process of the third group lens system 1B at Step S114, if the third group lens system 1B is returned to the nearer side of the optical axis than the reference position (Namely, the reference position signal is H (High)), the retracting process is executed. Otherwise, if the third group lens system is not returned to the side of the optical axis (if the reference position signal is L (Low)), the detection process waiting state is continued until the reference position signal changes to H and once the reference position signal changes to H, the retracting process is executed. After the retracting process is completed, the process is again returned to a start point of the actuation process and thus the actuation process is executed from the retracting detection determination at Step S101.

In the actuation reset determination at Step S112, it is determined that the number of resets reaches a predetermined number, an error process is executed (Step S115). In the error process at Step S115, the drive of the third group lens system frame motor 4B is stopped and thus the process is completed.

Further, the actuation process of the third group lens system 1B may be completed, by not executing the actuation reset determination at Step S112 but executing the retracting process of the third group lens system 1B after executing the stopping process of the third group lens system 1B at Step S111. In this case, the retracting process of the third group lens system 1B is executed after the stopping process of the third group lens system 1B at Step S111 is executed. The retracting process is similar in content to that of the retracting process at Step S114. Further, the lens barrel is adapted to be in a retracted state and a collapsed state by moving the first and second groups lens system 1A into the collapsed position after the retracting process of the third group lens system 1B is executed. Furthermore, the power source of the lens drive control device 100 is turned off.

In the stopping position detection determination (Step S109), if it is determined that the third group lens system 1B reaches the stopping position, the stopping process of the third group lens system 1B is executed and thus the process is completed.

As described above, the actuation process of the third group lens system 1B is completed. Since the actuation process of the first and second groups lens system 1A is not directly concerned with the gist of the present invention, thus detailed description be omitted.

As described above, it is possible to prevent the retracting lens group from being inappropriately actuated by detecting the abnormal actuation of the retracting lens group or the third group lens system 1B and thus repeating the restarting process.

Second Embodiment

Figure 7:
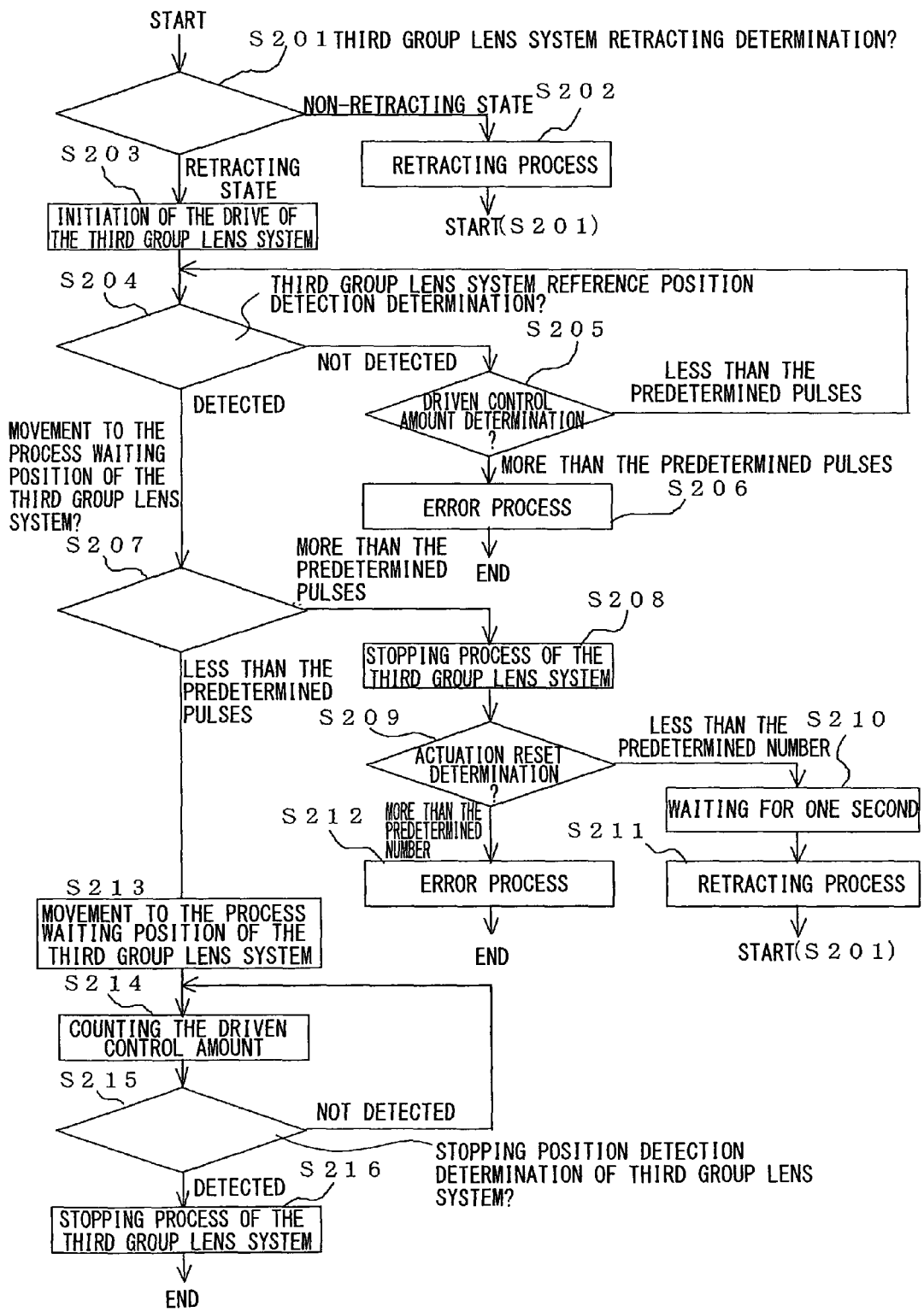
FIG. 7 is a flow chart illustrating the actuation control operation of the lens drive control device of a second embodiment of the present invention in which the third group lens system among the lens groups to be the main portions according to the present invention is in particular driven from the retracted position to the photographing process waiting position.

Next, the lens drive control device of a second embodiment according to the present invention will be explained. Essential structural and operational features are substantially the same as those of the first embodiment according to the present invention explained with reference to the accompanying drawings of FIGS. 1 to 5. Meanwhile, FIG. 7 is a flow chart illustrating the actuation control operation of the lens drive control device of the second embodiment according to the present invention in which the third group lens system among the lens groups s of the main portions according to the present invention is in particular driven from the third group lens system retracting position to the third group lens system photographing position.

Namely, in the lens drive control device of the second embodiment according to the present invention, the actuation control operation in which the third group lens system 1B is driven from the retracting position (A) in FIG. 8 to the photographing process waiting position (C) will be described with reference to a flow chart of FIG. 7.

First of all, the reference position determination is executed based upon a device for detecting the reference position 9B (Step S201). In the retracting determination at Step S201, if the reference position signal of the third group lens system 1B is H (High), since the third group lens system is in a position from the reference position to the photographing extended state, although the actuation control of the third group lens system 1B is in an initial state, it is determined that the third group lens system 1B is in a non-retracting state and thus the retracting process is executed (Step S202). In the retracting process at Step S202, the third group lens system 1B is moved to a retracting position prior to the reference position (a position ranging from the retracted state to the reference position). Thereafter, the third group lens system is returned to a start point or at Step S201, the retracting determination is executed by the device for detecting a position of the third group lens system 9B, and the retracting process is repeated until it is determined that the third group lens system is in a retracting state at Step S101. Since the retracting process itself is not directly concerned with the purpose of the present invention, thus detailed description be omitted.

In the retracting determination at Step S201, if the reference position signal output by the position detection device of the third group lens system 9B is H (high), since the third lend group system 1B is in a position from the retracted position to the reference position, it is determined that the third group lens system 1B is in a non-retracting state and thus the essential actuation process is executed. That is to say, more specifically, in the retracting determination at Step S201, if the reference position signal output by the position detecting device of the third group lens system 9B is L (Low) and thus it is determined that the third group lens system 1B is in a retracted state, and thus the drive of the third group lens system 1B is initiated thereby moving the third group lens system 1B in a direction of the optical axis for picking up an image (Step S203).

Thereafter, the reference position detection determination of the third group lens system 1B is executed by the device for detecting a position of the third lens system 9B (Step S204). In the reference position detection determination at Step S204, if the reference position (a position where the reference position signal changes from L (Low) to H (High)) is not detected, a process waiting state for detecting the reference position is executed.

During the drive of the third group lens system 1B by the third group lens system frame motor 4B, the driven control amount is counted based upon the number of driven pulses of a pulse motor or the third group lens system frame motor 4B and thus the driven control amount of the third group lens system 1B is monitored. In the reference position detection determination at Step S204, if the reference position is not detected, the driven control amount of the third group lens system 1B is determined by counting the driven pulses of the third group lens system frame motor 3B (Step S205).

In the driven control amount detection determination at Step S205, if the counted driven control amount is less than the predetermined pulses (namely, the counted driven control amount does not reach the predetermined pulses), Step S204 and Step S205 are alternately repeated and a process waiting state for detecting the reference position of the third group lens system 1B is executed until the reference position of the third group lens system 1B is detected. In the driven control amount detection determination at Step S205, if the counted driven control amount reaches the predetermined pulses, since the counted driven control amount reaches the predetermined pulses at Step S205 in a state that the reference position is not detected at Step S205, an error process is executed (Step S206). In this case, although the drive corresponding to the predetermined driven control amount is executed, the third group lens system does not reach the reference position. Therefore, since it is considered that any errors with respect to the driven control would occur, the error process must be executed. In the error process at Step S206, the drive of the third group lens system frame motor 4B is stopped and then the process is completed by executing, for example, the error displaying process and the like.

In the reference position detection determination at Step S204, if the reference position (a position where the reference position signal changes from L (Low) to H (High)) is detected, the driven control amount detection determination in which the number of pulses corresponding to the driven control amount of the third group lens system 1B, and the predetermined pulses are compared and determined, is executed (Step S207).

Namely, in the driven control amount detection determination for the reference position of the third group lens system at Step S207, it is determined whether the number of pulses corresponding to the driven control amount from the retracting state to the reference position are more than the predetermined pulses or not. The predetermined pulses is set to the number of pulses plus a which corresponds to a normal driven control amount from the retracting position to the reference position. In the driven control amount detection determination of the third group lens system at Step S207, if the number of pulses up to the reference position reaches the number of pulses more than the predetermined pulses, since the pulse motor is out of step due to the factors of the vibrations and the like and it is considered that the pulse motor is regarded as being idly run, therefore, the drive of the third group lens system 1B is stopped (Step S208). Thereafter, in the actuation reset determination as to whether the number of resets is less than the predetermined number or not, the number of resets is determined (Step S209). In the actuation reset determination at Step S209, if the number of resets is less than the predetermined number, a process waiting for one second is executed (Step S210), thereafter, the retracting process of the third group lens system 1B is executed and then the number of resets is incremented by plus one (+1) (Step S211).

In the retracting process of the third group lens system 1B at Step S211, if the third group lens system 1B is returned to the nearer side of the optical axis for picking-up an image than the reference position (namely, the reference position signal is H (High)), the retracting process is executed. Otherwise, if the third group lens system is not returned (if the reference position signal is L (Low)), the detection process waiting state continues until the reference position signal changes to H and once the reference position signal changes to H, the retracting process is executed. After the retracting process is completed, the process is again returned to a start point of the actuation process and thus the actuation process is executed from the retracting process detection determination of the third group lens system at Step S101.

In the actuation reset determination at Step S209, it is determined that the number of resets reaches the predetermined number, an error process is executed (Step S212). In the error process at Step S112, it is determined that the number of resets reaches a predetermined number, an error process is executed.

Further, the actuation process of the third group lens system 1B may be completed, by not executing the actuation reset determination at Step S209 but executing the retracting process of the third group lens system 1B. In this case, the retracting process of the third group lens system 1B is executed after the stopping process of the third group lens system 1B is executed at Step S208. The retracting process is similar in content to that of the retracting process at Step S211.

Further, the lens barrel is adapted to be in a retracted and collapsed state by moving the first and second groups lens systems 1A into the stored position after the retracting process of the third group lens system 1B is executed. Furthermore, the power source of the lens drive control device 100 is turned off.

In the driven control amount detection determination for the reference position of the third group lens system at Step S207, if the number of pulses does not reach the predetermined number of pulses and is less than the number of predetermined pulses, the counted driven pulses of the third group lens system frame motor 3B or the counted driven control amount of the third group lens system 1B is reset to zero (0), the drive of the third group lens system 1B to a photographing waiting state position is initiated (Step S213), and the driven control amount is counted (Step S214). In this way, 500 pulses which correspond to the driven control amount from the reference position of the third group lens system 1B to the photographing waiting state position is counted, namely, a process waiting state for detecting that the third group lens system 1B is driven to the photographing waiting state position is executed (Step S215).

Namely, in the stopping position detection determination at Step S215, if the third group lens system does not reach the stopping position, therefore, the number of counts of 500 pulses is not detected, the process is returned to the Step S214. The stopping position detection determination of the third group lens system 1B at Step S215 is executed while counting the driven control amount (driven pulses). If the stopping position is not detected, the motion which returns to the Step S214 are repeated while a stopping position detection process waiting state is executed.

In the stopping position detection determination of the third group lens system 1B at Step S215, it is determined that the third group lens system reaches the stopping position, the stop of the third group lens system motor 4B is executed and thus the movement of the third group lens system 1B is stopped (Step S216), the process is completed.

As mentioned above, the actuation process of the third group lens system 1B is completed. Further, with regard to the actuation process of the first and second groups lens system 1A, since it is not directly concerned with the gist of the present invention, thus detailed description omitted.

As described above, the actuation failure of the retracting lens group is avoided by detecting the abnormal actuation of the retracting lens group or the third group lens system 1B and repeating restart processes.

Further, in each of the embodiments as described above, among the first group lens system (the first group) to the third group lens system (the third group lens system), although the third group lens system 1B is explained as the retracting lens, for example, the second lens group may be the retracting lens group. The necessary lens group except for a lens group at an end portion of an object side in another lens structure such as a four lens group system and the like comprising a fourth lens group in a four lens groups structure may be a retractable structure as the retracting lens.

Further, in a mode of each of the embodiments, although the reference position is explained as being set in a position near to the retracted position, the reference position is not limited to the vicinity of the retracted position but may be positioned in an appropriate position on which the retracting lens group is moved along a track from the retracted position to the position on the optical axis.

Furthermore, in the first embodiment, if the retracting lens group detects for a plurality of times due to the reference position detection that the retracting lens group reaches the reference position, it is determined that the actuation is abnormal. In the second embodiment, if the driven control amount until the retracting lens group reaches the reference position due to the reference position detection reaches a predetermined value, it is determined that the actuation is abnormal. By combining these, if the retracting lens group detects for a plurality of times due to the reference position detection, and if the driven control amount until the retracting lens group reaches the reference position due to the reference position detection, in each case, it may be determined that the actuation is abnormal.

Meanwhile, "a piece of (some) lens groups, for example, the retracting lens group reaches the reference position" has meanings in response to "the reference positional signal changes from L to H, and the reference positional signal changes from H to L".

Next, a lens drive control device in the third embodiment according to the present invention will be explained below.

Figure 10:
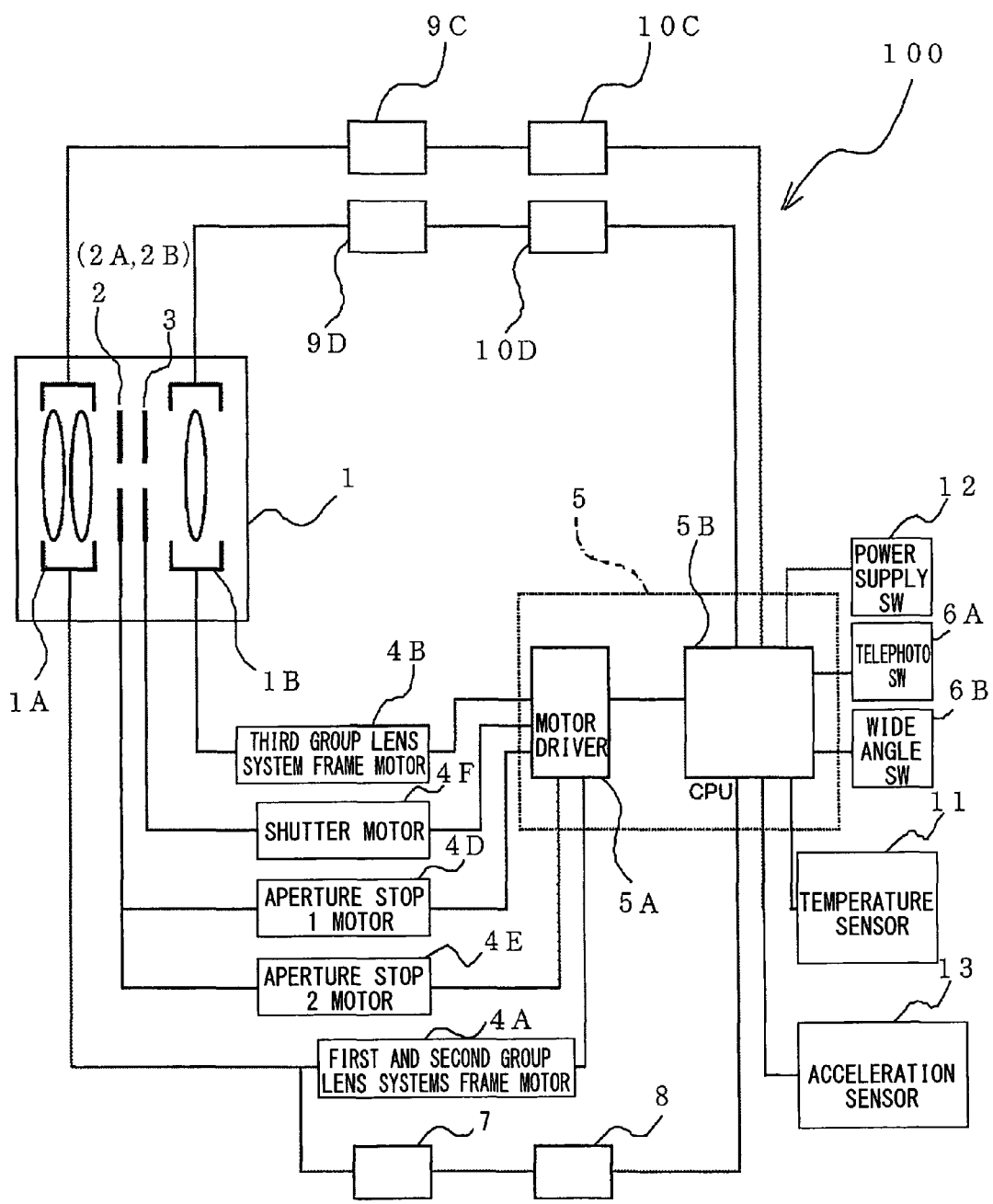
FIG. 10 is a schematic bloc diagram illustrating the hardware structure of the third group lens system to be the main portions of the lens drive control device of a third embodiment according to the present invention.
Figure 11:
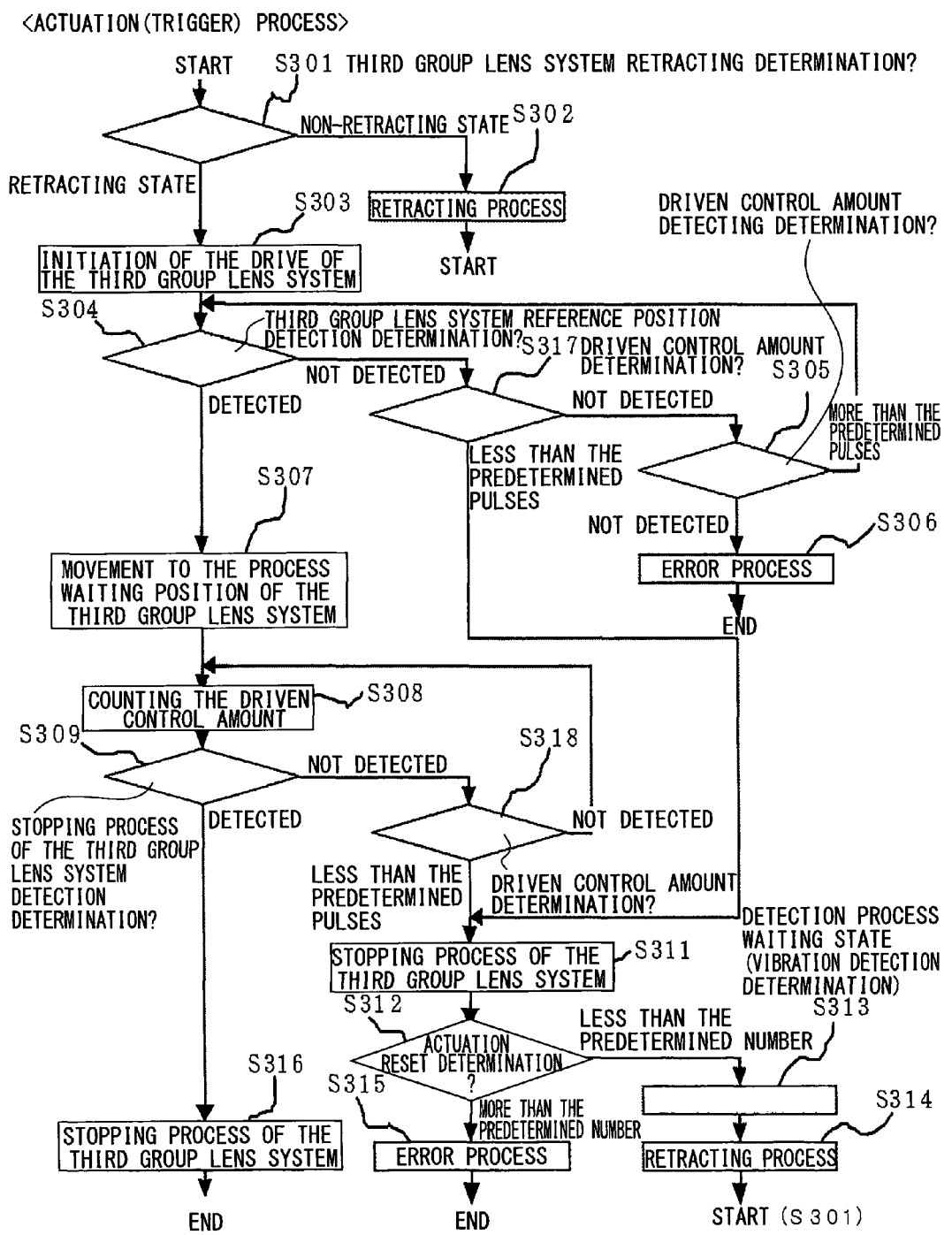
FIG. 11 is a flow chart illustrating the actuation control operation which drives the third group lens system to be the main portions of the lens drive control device of a third embodiment according to the present invention from the retracted position to the photographing process waiting position.

FIG. 10 is a schematic block diagram illustrating a hardware structure of the lens drive control device of the third embodiment according to the present invention. FIG. 11 is a flow chart whether the third group lens system of the main portions of the lens drive control device according to the third embodiment of the present invention is in the reference position or not, and illustrating the operation to drive from the retracting position to the photographing waiting position or the photographing extended position.

In the third embodiment, in particular, an acceleration sensor is attached, thereby measuring acceleration values of both X-axis and Y-axis directions, the vibration amount is determined by the acceleration values. If the vibration values more than the predetermined value, it is determined whether the vibration is abnormal or not, and the required process is made, which are different from the above-mentioned first embodiment.

Further, the block diagram of FIG. 10 of the third embodiment corresponds to the bock diagram of FIG. 1 of the first embodiment, although the addition of the acceleration sensor 13, and the a device for detecting the reference position of the first and second groups lens system 9C, a device for detecting the reference position of the third group lens system 9D, a drive circuit for the reference position detection device of the first and second groups lens system 10C, and a drive circuit for the reference position detection device of the third group lens system 10B are different from the position detection device of the first and second groups lens system frame 9A of a block diagram in FIG. 10, the position detection device of the third group lens system frame, both have functions for detecting each reference position and thus, substantially equivalent in structure and operation.

And, although it is common to the above-mentioned, a lens drive control device of the third embodiment will be described with reference to FIGS. 10 and 11.

In FIG. 10, the image pickup lens 1 comprises three lens groups each lens group including a plurality of lens, from an object surface side, the first lens group, the second lens group, and the third group lens system are arranged in sequence. Wherein the first lens system and the second lens system are integrally formed and thus constitute the first and second groups lens system 1A.

The first and second groups lens system is explained below as the first and second groups lens system 1A (lens group of an object side) and the third group lens system is explained below as the third group lens system 1B.

The first and second lens group lens systems 1A and the third group lens system 1B are disposed within the lens barrel, with the optical axis being common to both systems. Wherein, behind the first and second groups lens system 1A is arranged the aperture stop 2 comprised of the first aperture stop 2A and the second aperture stop 2B, which controls the light volume passing through the image pickup lens from the subject, and the shutter 3 which controls the exposure time when picking up an image is disposed.

The first and second groups lens system 1A is a lens group for zooming to change, for example, an imaging magnification. The third group lens system 1B is a lens group for focusing to focus an image of the subject on an exposure surface (not shown) located behind the third group lens system 1B. The lens group of an object side or the first and second groups lens system 1A and the third group lens system 1B are driven by the first and second groups lens system frame motor 4A and the third group lens system frame motor 4B, respectively, and moves parallel to the optical axis to establish a targeted optical system.

Herein, the first and second groups lens system frame motor 4A which drives the first and second groups lens system 1A is a direct current (DC) motor, the third group lens system motor 4B which drives the third group lens system 1B is a pulse motor (the drive mechanisms be omitted).

The DC motor is a lens drive device in which a drive speed changes in response to the drive voltage to be applied, so that only a simple operation such as changing the voltage to be applied can adjust the drive speed which drives the first and second groups lens system 1A.

Further, the DC motor can generally rotate faster than the pulse motor if the supplying power is equivalent. Furthermore, since the DC motor has a characteristic that the drive current changes in response to the change of load, the drive current increases as the load increases, and, as a result, the drive torque increases, the DC motor can obtain the drive motion characteristic that is durable against the load variation and is smooth.

Therefore, it is preferable for the drive such as the inclination of the cam changing in response to the zooming position (the load torque changing therewith), for example, of the cam cylinder.

Further, the DC motor is a lens drive device in which the drive speed changes in response to the duty ratio (a ratio of on-state over a period), so that only a simple operation such as changing the ratio of turning on the power for driving which enters the lens drive device can adjust the drive speed which drives the first and second groups lens system 1A.

On the contrary, when stopping the DC motor, since it is inevitable to produce the offset from the initiation of the stopping control to the actual stopping due to the inertia, what is known, the overrun, therefore, it is difficult to correctly stop in the desired position. In this respect, since the pulse motor drives in a stepped manner by applying pulses, it is easy to stop at an arbitrary target position but it is not so strong against the torque variation, and thus it is preferable to employ the pulse motor for the control in a case when the torque variation is scarce (small).

Further, provided on the first aperture stop 2A, the second aperture stop 2B, and the shutter 3 are the first aperture stop motor 4D, the second aperture stop motor 4E, and the shutter motor 4F, in order to drive each of them, respectively. The actuations of these motors 4D, 4E, and 4F drives the first aperture stop 2A, the second aperture stop 2B, and the shutter 3, respectively (drive mechanism be omitted). Furthermore, each motor of these 4A to 4F is electrically connected to the motor driver 5A and thus is intensively controlled.

The motor driver 5A obtains necessary information from the electrically connected CPU 5B in order to perform the drive control of each motor 4A to 4F, for example, the information of the drive voltage, the drive timing, the driven control amount, the drive direction or the like, based upon these information of the drive control of each motor 4A to 4F is executed.

Herein, provided on the first and second groups lens system frame motor 4A is a device for detecting the driven control amount of the first and second groups lens system 7 which generates pulses in response to the number of rotation of the motor 4A when it rotates. The driven control amount detection device of the first and second group lens system 7 is driven by the drive circuit for the driven control amount detection device of the first and second groups lens system 8 which is electrically connected. Pulses which are output by the driven control amount detection device of the first and second groups lens system 7 are taken in the CPU 5B.

The driven control amount detection device of the first and second groups lens system 7 is set to output the predetermined number of pulses, for example, 1280 pulses between the most telephoto state and the most wide angular state.

The whole section between the most telephoto state and the most wide angular state is divided into the predetermined number (for example into 16 equally sections) (one equally section every 80 pulses). Set to 17 delimitations of the 16 sections are positional indices, what is known, zooming positions, Zp1, Zp2, . . . , Zp17.

Herein, a relationship between output pulses of the driven control amount detection device of the first and second groups lens system 7 and the zooming positions from Zp1 to Zp17 will be shown in FIG. 2.

The number of pulses shown in FIG. 2, as the reference position being counted as when viewed from the reference position to the retracted and collapsed position, it is counted as a negative value.

Meanwhile, the third group lens system frame motor 4B is driven by the driven speed corresponding to the number of pulses input from the motor driver 5A in accordance with the indications from the CPU 5B.

In addition, the first and second groups lens system 1A comprises a device for detecting a position, of the first and second groups lens system 9A which detects the reference position thereof, and the third group lens system 1B comprises a device for detecting a position of the third group lens system 1B which detects the reference position thereof. Thereby, it is detected whether the first and second group lens system 1A and the third group lens system 1B are positioned in the reference positions or not. In FIG. 3, a positional relationship between the reference position detection signal output by the reference position detection device of the first and second groups lens system 9C and the position of the first and second groups lens system 1A are shown. Also, in FIG. 4, a relationship between the reference position signal output by the reference position detection device of the third group lens system 9D is shown.

These reference position detection device of the first and second groups lens system 9C and reference position detection device of the third group lens system 9D are driven by a drive circuit for the reference position detection device of the first and second groups lens system 10C and a drive circuit for the reference position detection device of the third group lens system 10D, respectively.

In addition, the information detected by the driving circuit for the reference position detection device of the first and second groups lens system 10C and the drive circuit for the reference position detection device of the third group lens system 10D is taken in the CPU 5B.

Electrically connected to the CPU 5B are a telephoto switch (telephoto SW designated in FIG. 10) 6A as a zooming switch which operates in order to make the magnification high when photographing a telephoto image, and a wide angular switch (wide angular SW designated in FIG. 10)) 6B as a zooming switch which operates in order to make the magnification low when imaging a wide angular image. The CPU 5B controls the first and second groups lens system frame motor 4A and the third group lens system frame motor 4B, respectively, in response to the operations of the telephoto switch 6A and the wide angular switch 6B.

And, the motor driver 5A and the CPU 5B constitutes a control device 5.

In addition, the first lens group and the second lens groups constituting the first and second groups lens system 1A are attached to a cam cylinder (not shown) in which an interval between these two lens groups is mechanically adjusted by a cam mechanism. When the first and second groups lens system 1A is driven by the first and second groups lens system 4A, it is mechanically driven so that the interval between the first lens group and the second lens group becomes the predetermined interval.

Further, the temperature sensor 11 is connected to the CPU 5B. The temperature sensor 11 outputs the voltage value which changes in response to the temperature. This value is converted by A/D converter and taken in by the CPU 5B. Since the temperature sensor 11 in this third embodiment has a characteristic of, for example, changing 10 mV per 1 degree, by previously storing voltage values corresponding to arbitrary temperatures, thereby enabling for a user to grasp the current temperature.

Further, connected to the CPU 5B is an acceleration sensor 13. Acceleration values including both the directions of X and Y axles are output by the acceleration sensor 13 as digital values. The CPU 5B determines the vibration amount by the acceleration values.

Next, in a lens barrel of the third embodiment according to the present invention from the retracted state and collapsed state to the process waiting state will be described with reference to a timing chart of FIG. 5.

When the control of the lens barrel is initiated, an initial setting of the lens barrel is initiated. In an initial setting, the initiation of the motor driver for driving the motor system and the initiation of the position detection device are initialized.

If the detecting result of the device for detecting the reference position of the first and second lens group lens system 9C is a collapsed position and the detecting result of the reference position detection device of the third group lens system 9D is a retracted position, the first and second groups lens system frame motor 4A is driven toward the wide angular direction.

The driven control amount by the first and second groups lens system frame motor 4A is detected by the driven control amount detection device of the first and second groups lens system 7. The driven control amount is detected by counting an edge portion of the pulse-like signal (PI signal) output by the driven control amount detection device of the first and second groups lens system 7.

In a predetermined actuation period right after the initiation of actuation of the first and second groups lens system frame motor 4A, the drive voltage is set to be lower.

After the actuation period is lapsed, the drive voltage is increased to the stationary state voltage.

From the actuation of the first and second groups lens system frame motor 4A, after it lapses 50 ms (PI signal: 50 pulses), the shutter motor 4F executes full open control of the shutter 3 to set the shutter in a full open state.

Next, a control of the intermediate restriction is executed by the first aperture stop motor 4D and the second aperture stop motor 4E to thereby setting the intermediate aperture stop state.

During the drive of the shutter 3 and the aperture stop 2, the first and second groups lens system frame motor 4A is simultaneously driving.

If the restriction of the aperture stop is completed, a process waiting state for detecting the reference position by the reference position detection device of the first and second groups lens system 9C is executed.

A place where the reference position signal (HP signal) output by the reference position detection device of the first and second groups lens system 9C changes from L to H becomes the reference position (HP position) of the first and second groups lens system 1A.

If the reference position (HP position) of the first and second groups lens system 1A is detected, the positional information concerning the first and second groups lens system 1A is reset. This position is made as a reference position and thus by counting pulse-like signal output by the driven control amount detection device of the first and second groups lens system 7, the driven control amount to the wide angular position of the first and second groups lens system is executed. Although the wide angular position is previously set, it can be rewritten by a nonvolatile memory such as an EEPROM and the like.

During the predetermined pulse period prior to the wide angular position, the stop control is executed and the drive voltage is gradually lowered in response to the remaining number of pulses up to the wide angular position. Such a control reduces the occurrence of overrun when the system reaches the wide angular position. The PI signals output by the driven control amount detection device of the first and second groups lens system 7 is counted and if it is detected that the first and second groups lens system 1A reaches the wide angular position, the brake control in order to stop the drive of the first and second groups lens system 1A is executed. The overrun amount during this brake control is counted and thus the final position of the first and second groups lens system 1A is determined.

Further, if the reference position (HP position) of the first and second groups lens system 1A is detected, the drive of the third group lens systems frame motor 4B to the direction for a process waiting state position is initiated. The drive controls of the first and second groups lens system 1A and the third group lens system 1B are simultaneously executed. By setting the pulse rate of the third group lens system higher than the normal drive, the drive time of the third group lens system is adapted to be reduced.

And, as the drive control of the third group lens system 1B, the process waiting state for detecting the reference position by the reference position detection device of the third group lens system 9D is executed.

A place where the reference position signal (HP signal) output by the reference position detection device of the third group lens system 9D changes from L to H becomes the reference position (HP position) of the third group lens system 1B.

If the reference position (HP position) of the third group lens system 1B is detected, the positional information concerning the third group lens system 1B is reset. This position is made as a reference position and thus the driven control amount to the wide angular position of the third group lens system 4B is executed in a pulse-like manner. Although the process waiting state position is previously set, it can be rewritten by a nonvolatile memory such as an EEPROM and the like.

Further, since the current value at a steady state of the first and second groups lens system frame motor 4A or the DC motor is most low, a simultaneous drive timing is set to overlap the steady state of the first and second groups lens system frame motor 4A. Namely, the drive control of the first and second groups lens system frame motor 4A is executed so that the first and second groups lens system frame motor 4A and the shutter motor 4F, the first and second groups lens system frame motor 4A and the second aperture stop motor 4D, the first and second groups lens system frame motor 4A and the second aperture stop motor 4E, and the first and second groups lens system frame motor 4A and the third group lens system frame motor 4B, are simultaneously driven, respectively.

In this embodiment according to the present invention, the current value at a steady state of the DC motor is approximately 125 mA, the current value at a steady state of the third group lens system motor 4B is approximately 185 mA, the current value at a steady state of the shutter motor 4F is approximately 160 mA, the current value at a steady state of the first aperture stop motor 4D and the second aperture stop motor 4E is approximately 200 mA, respectively.

Next, the actuation control method in which the third group lens system 1B is driven from the retracting position (A) shown in FIG. 8 to the photographing waiting (extended) position (c) shown in the same will be described below.

Third Embodiment

In a flow chart shown in FIG. 11, although the retracting process at Step S302 from to the stopping process of the third group lens system at Step S316 performs similar processes to those of the retracting process at Step S102 from to the stopping process of the third group lens system at Step S116, in particular, the vibration detection determination at Step S317 and the vibration detection determination at Step S318 are newly added processes. The process waiting for a stationary state (the vibration detection determination) at Step S313 is different in content from that of a process waiting for one second at Step S113 shown in FIG. 6.

Figure 6:
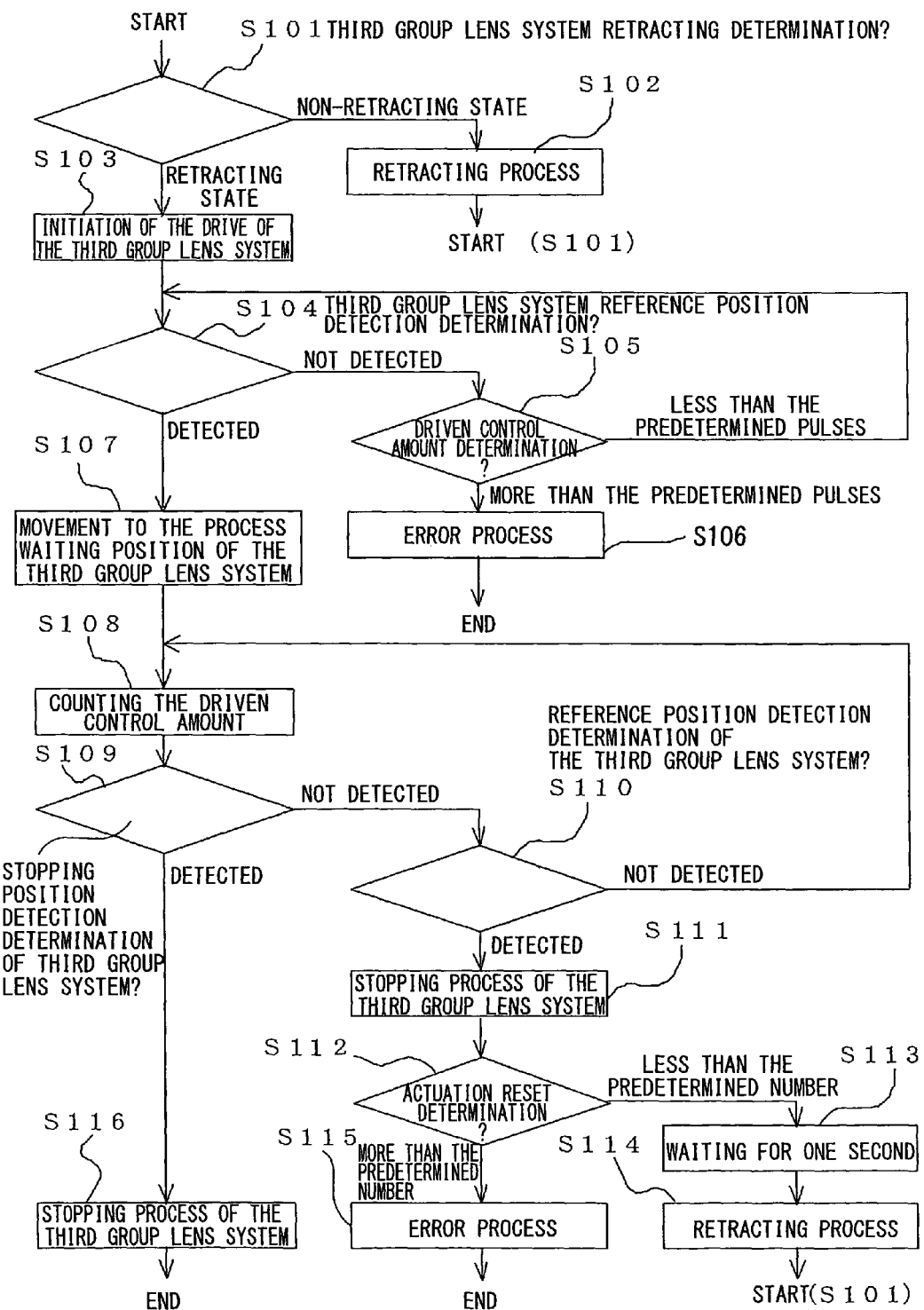
FIG. 6 is a flow chart illustrating the third group lens system among the lens groups which are adapted to be the main portions according to the present invention, the actuation control operation of the third group lens system which moves from the retracting position of the third group lens system to a process waiting position for photographing of the same being particularly explained.

Further, although the reference position determination of the third group lens system at Step S301 is different from the retracting process of the third group lens system at Step S101 shown in FIG. 6, the sequence is almost the same as the latter.

First of all, the reference position determination is executed based upon a device for detecting the reference position 9D (Step S301). If the reference position signal of the third group lens system is in a High state, it is determined that the position of the third group lens system 1B is in a non-retracted state, the retracting process is executed (Step S302). The content of the retracting process is such that the third group lens system is moved to the retracted position. Thereafter, in the reference position determination of the third group lens system at Step S301, the reference position determination of the third group lens system is again executed (Step S301). Since the details thereof are not directly concerned with the purpose of the mode for carrying out the present invention, thus be omitted.

The reference position signal of the third group lens system is in a Low state, it is determined that a position of the third group lens system 1B is in a retracted position state and thus an actuation process is executed. More specifically, the third group lens system frame motor 4B is driven toward a direction of the optical axis (Step S303).

Thereafter, the process proceeds to Step S304 and, based upon the reference position detection determination by the reference position detection device of the third group lens system 9D, a process waiting state for detecting the reference position (a position changing from L to H) is executed.

Based upon the reference position detection determination by the reference position detection device of the third group lens system 9D (Step S304), if the reference position (a position changing from L to H) is not detected, the vibration detection determination is executed (Step S317).

In the vibration detection determination at Step S317, when an output of the acceleration sensor 13 is more than a first threshold value, it is determined that the third group lens system is in a vibratory state.

Further, in the vibratory state, when an output of the acceleration sensor 13 continues to be less than a second threshold value for five seconds, it is determined that the system is recovered in a stationary state. As threshold values, the first threshold value is greater than the second threshold value.

At Step S317, if the third group lens system is in a stationary state (vibration is not detected) in the vibration detection determination, the driven control amount determination is executed at Step S305.

In the vibration detection determination, if it is determined that the third group lens system is in a vibratory state, it is determined that the third group lens system is in an abnormal actuation state and thus the drive of the third group lens system 1B is stopped. Thereafter, the number of resets is determined in the number of actuation resets determination (Step S312). If the number of resets is less than the predetermined value, after the process waiting for a stationary state is executed, the retracting process of the third group lens system is executed (Step S314). In the process waiting for the stationary state (at Step S313), as a result of an output of the acceleration sensor 13, it becomes a process waiting state for recovering from the vibratory state to the stationary state. In the retracting process of the third group lens system, if the third group lens system is returned to the side of the optical axis (if the reference position signal is in a High state), the retracting process is further executed. Otherwise, if the third group lens system is not returned to the side of the optical axis (if the reference position signal is in a Low state), it is waited until the reference position signal changes to H and once the reference position signal changes to H, the retracting process is executed. After the retracting process is completed, the reference position determination of the third group lens system is again executed (Step S301).

In the number of actuation resets determination at Step S312, the number of resets reaches the predetermined number, an error process is executed (Step S315). In the error process, the drive of the third group lens system frame motor 4B is stopped.

Further, the actuation process of the third group lens system 1B may be stopped, by not executing the actuation reset determination at Step S312 but executing the retracting process of the third group lens system 1B after executing the stop process of the third group lens system 1B at Step S311. In this case, the retracting process of the third group lens system 1B is executed after the stop process of the third group lens system 1B at Step S311 is executed. The retracting process is similar in content to that of the retracting process at Step S314. Further, the lens barrel is made in a retracted state and collapsed state by moving the first and second groups lens system 1A into the collapsed position after the retracting process of the third group lens system 1B is executed. Furthermore, the power source of the lens drive control device 100 is turned off.

Further, during the drive of the third group lens system frame motor 4B, the driven control amount is counted by the number of drive pulses of the third group lens system frame motor 4B.

In the driven control amount determination (Step S305), if it is determined to be less than the number of predetermined pulses, the process waiting for detecting the reference position of the third group lens system is made until the reference position of the third group lens system is detected. In the driven control amount determination, if the driven control amount of the third group lens system reaches the predetermined number of pulses and wherein the reference position of the third group lens system is not detected, then the error process is executed (Step S306). In the error process, the drive of the third group lens system frame motor 4B is stopped.

If the reference position (a position changing from L to H) is detected based upon the reference position detection determination by the reference position detection device of the third group lens system 9D, the number of counted driven control amount is reset to zero and thus the process waiting for detecting the driven control amount up to a process waiting position or 500 pulses is executed (a position detection determination process waiting for the stopping position at Step S309).

In the stopping position detection determination of the third group lens system at Step S309, if the third group lens system does not reach the stopping position, the vibration detection determination is executed (Step S318).

In the vibration detection determination, when an output of the acceleration sensor 13 is more than a first threshold value, it is determined that the third group lens system is in a vibratory state. Further, in the vibratory state, when an output of the acceleration sensor 13 continues to be less than a second threshold value for five seconds, it is determined that the third group lens system is recovered in the stationary state. As threshold values, the first threshold value is selected greater than the second threshold value.

In the vibration detection determination (Step S318), if it is determined that the third group lens system is in an abnormal state, it is determined that the third group lens system 1B is in the abnormal actuation state and thus the drive of the third group lens system 1B is stopped (Step S311). Thereafter, the number of resets is determined in the number of actuation resets determination (Step S312). If the number of resets is less than the predetermined value, after a process waiting for a stationary state is executed (Step S313), the retracting process of the third group lens system is executed (Step S314). In the process waiting for the stationary state, as a result of an output of the acceleration sensor 13, it becomes a process waiting state for recovering from the vibratory state to the stationary state is executed. In the retracting process of the third group lens system, if the third group lens system is returned to the side of the optical axis (if the reference position signal is in a High state), the retracting process is executed. Otherwise, if the third group lens system is not returned to the side of the optical axis (if the reference position signal is in a Low state), it is waited until the reference position signal changes to H and once the reference position signal changes to H, the retracting process is executed. After the retracting process is completed, the reference position determination of the third group lens system is again executed at Step S301.

In the number of actuation resets determination (Step S312), the number of resets reaches the predetermined number, an error process is executed (Step S315). In the error process, the drive of the third group lens system frame motor 4B is stopped.

Further, the actuation process of the third group lens system 1B may be completed, by not executing the number of actuation resets determination at Step S312 but executing the retracting process of the third group lens system 1B after the stopping process of the third group lens system at Step S311 is executed. In this case, the retracting process of the third group lens system 1B is executed after the stopping process of the third group lens system 1B at Step S311 is executed. The retracting process is similar in content to that of the retracting process at Step S314. Further, the lens barrel is adapted to be in a retracted state and collapsed state by moving the first and second groups lens system 1A into the retracted position and collapsed position after the retracting process of the third group lens system 1B is executed. Furthermore, the power source of the lens drive control device 100 is turned off.

In the vibration detection determination (Step S318), if it is determined to be in the stationary state, the process waiting for detecting the stopping position are repeated while counting the driven control amount (Step S308). In the stopping position detection determination of the third group lens system (Step S309), if the third group lens system reaches the stopping position, the stopping process of the third group lens system frame motor 4B is executed (Step S316).

Thus, the actuation process of the third group lens system 1B is completed. The actuation process of the groups lens system 1A is omitted.

By executing the actuation process of the third group lens system 1B as described above, it is possible to appropriately detect abnormal operations, for example, the vibrations of the retracting lens group in the actuation process thereof and the interference with other elements and the like thereof. Further, it is also possible to prevent or avoid the retracting lens group (lens frame) from being inappropriately actuated by repeating the restarting process.

In addition, by employing the lens drive control system according to the present invention, it is possible to constitute an image pickup device, for example, a camera such as digital cameras and the like, a mobile phone (a portable information terminal) having camera functions integrated therein.

The invention claimed is:

1. A lens drive control device for a lens barrel, which controls at least a part of a plurality of lens groups respectively including at least one lens, the part being a retracting lens group, wherein a state of the lens barrel transits from a collapsed state in which the lens groups are collapsed to a photographing extended state in which the lens groups are extended, the collapsed state being a state in which the retracting lens group is moved into a retracted position which is off from an optical axis, the photographing extended state being a state in which the retracting lens group is moved from the retracted position to the photographing extended state in which the retracting lens group is positioned on the optical axis along which the lens groups including the retracting lens group are moved, the lens drive control device comprising:

a vibration amount detection device which detects a vibration amount, and a determination device which determines an abnormal actuation based upon a detection by the vibration amount detection device, upon actuation when the retracting lens group is moved from the retracted position to the position on the optical axis, wherein the determination device determines that the actuation is abnormal when the vibration amount detected by the vibration amount detection device is more than a predetermined value, and wherein when the determination device determines that the actuation is abnormal, the actuation reset device returns the retracting lens group to the retracted position after the vibration amount detection device detects a state where a vibration amount is not detected for a predetermined time.

2. The lens drive control device as claimed in claim 1, further comprising: a reference position detection device which detects that the retracting lens group reaches a reference position, the reference position being set on a track along which the retracting lens group is moved between the retracted position and the position on the optical axis, wherein the determination device determines that the actuation is abnormal when the vibration amount detected by the vibration amount detection device is more than the predetermined value after the reference position detection device detects that the retracting lens group has reached the reference position.

3. The lens drive control device as claimed in claim 1, further comprising: an actuation reset device which executes an actuating operation which returns the retracting lens group to the retracted position and again moves the retracting lens group from the retracted position to the position on the optical axis, if the determination device determines that the actuation is abnormal.

4. An image pickup device comprising the lens drive control device as claimed in claim 1.

* * * * *